United States Patent
Gunda et al.

(10) Patent No.: US 9,992,274 B2
(45) Date of Patent: *Jun. 5, 2018

(54) PARALLEL I/O WRITE PROCESSING FOR USE IN CLUSTERED FILE SYSTEMS HAVING CACHE STORAGE

(71) Applicant: International Business Machines Corporation, Armonk, NY (US)

(72) Inventors: Kalyan C. Gunda, Bangalore (IN); Dean Hildebrand, Bellingham, WA (US); Manoj P. Naik, San Jose, CA (US); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/411,848

(22) Filed: Jan. 20, 2017

(65) Prior Publication Data

US 2017/0134482 A1 May 11, 2017

Related U.S. Application Data

(63) Continuation of application No. 14/265,152, filed on Apr. 29, 2014, now Pat. No. 9,614,926.

(51) Int. Cl.
G06F 7/00 (2006.01)
H04L 29/08 (2006.01)
G06F 17/30 (2006.01)

(52) U.S. Cl.
CPC .... *H04L 67/1008* (2013.01); *G06F 17/30132* (2013.01); *G06F 17/30224* (2013.01); *H04L 67/101* (2013.01); *H04L 67/2842* (2013.01)

(58) Field of Classification Search
None
See application file for complete search history.

(56) References Cited

U.S. PATENT DOCUMENTS

| 8,793,343 | B1 | 7/2014 | Sorenson, III et al. |
| 9,614,926 | B2 | 3/2017 | Gunda et al. |
| 9,667,736 | B2 | 5/2017 | Gunda et al. |
| 9,892,130 | B2 | 2/2018 | Gunda et al. |
| 2002/0184324 | A1 | 12/2002 | Carlin et al. |

(Continued)

FOREIGN PATENT DOCUMENTS

WO  2012175140 A1  12/2012

OTHER PUBLICATIONS

Gunda et al., U.S. Appl. No. 15/462,588, filed Mar. 17, 2017.

(Continued)

*Primary Examiner* — Thu Nga Nguyen
(74) *Attorney, Agent, or Firm* — Zilka-Kotab, P.C.

(57) ABSTRACT

In one embodiment, a system is configured to use an owner GW node to write data for a first fileset and determine whether to utilize one or more other GW nodes to handle at least a portion of write traffic for the first fileset, select a set of eligible GW nodes, assign and define a size for one or more write task items for each GW node based on a current dynamic profile of each GW node, provide and/or ensure availability to in-memory and/or I/O resources at each GW node in the set of eligible GW nodes to handle one or more assigned write task items, and distribute workload to the set of eligible GW nodes according to the size for each of the one or more assigned write task items for each individual GW node in the set of eligible GW nodes.

20 Claims, 14 Drawing Sheets

(56) References Cited

U.S. PATENT DOCUMENTS

| | | | |
|---|---|---|---|
| 2010/0080144 A1* | 4/2010 | Greenberg | H04L 12/1863 370/253 |
| 2010/0124233 A1* | 5/2010 | Shi | H04L 45/00 370/401 |
| 2011/0145367 A1* | 6/2011 | Ananthanarayanan | H04L 67/2842 709/219 |
| 2011/0150005 A1* | 6/2011 | Chen | H04J 3/0667 370/503 |
| 2011/0258161 A1 | 10/2011 | Constantinescu et al. | |
| 2012/0059934 A1 | 3/2012 | Rafiq et al. | |
| 2012/0258744 A1 | 10/2012 | Jiang et al. | |
| 2012/0311691 A1 | 12/2012 | Karlin et al. | |
| 2013/0144983 A1 | 6/2013 | Vantalon et al. | |
| 2013/0198302 A1* | 8/2013 | Kinoshita | H04L 12/58 709/206 |
| 2013/0301413 A1 | 11/2013 | Moen et al. | |
| 2014/0129284 A1 | 5/2014 | Rexrode et al. | |
| 2014/0140213 A1 | 5/2014 | Raleigh et al. | |
| 2015/0312342 A1 | 10/2015 | Gunda et al. | |
| 2015/0312343 A1 | 10/2015 | Gunda et al. | |
| 2017/0193007 A1 | 7/2017 | Gunda et al. | |

OTHER PUBLICATIONS

List of IBM Patents or Patent Applications Treated As Related.
Non-Final Office Action from U.S. Appl. No. 15/462,588, dated Jun. 6, 2017.
Gunda et al., U.S. Appl. No. 14/265,176, filed Apr. 29, 2014.
Gunda et al., U.S. Appl. No. 14/265,152, filed Apr. 29, 2014.
Non-Final Office Action from U.S. Appl. No. 14/265,152, dated Apr. 4, 2016.
Seema et al., "An Approach to Improve the Web Performance by Prefetching the Frequently Access Pages," International Journal of Advanced Research in Computer Engineering & Technology, vol. 1, No. 4, Jun. 2012, pp. 525-634.
EMC, "WAN Optimization Technologies in EMC Symmetrix Replication Environments," $EMC^2$ White Paper, Jan. 2009, pp. 1-11.
Griffioen et al., "Automatic Prefetching in a WAN," Technical Report #CS243 93, Appeared in the IEEE Workshop on Advances in Parallel and Distributed Systems, Oct. 1993, pp. 1-5.
Griffioen et al., "Reducing File System Latency using a Predictive Approach," Proceedings of the USENIX Summer 1994 Technical Conference on USENIX, vol. 1, Jun. 1994, pp. 1-11.
Notice of Allowance from U.S. Appl. No. 14/265,152, dated Aug. 23, 2016.
Svobodova, L., "File Servers for Network-Based Distributed Systems", Computing Surveys, vol. 16, No. 4, Dec. 1984, pp. 353-398.
Non-Final Office Action from U.S. Appl. No. 14/265,176, dated Sep. 19, 2016.
Notice of Allowance from U.S. Appl. No. 14/265,152, dated Nov. 18, 2016.
Notice of Allowance from U.S. Appl. No. 14/265,176, dated Jan. 5, 2017.
Notice of Allowance from U.S. Appl. No. 15/462,588, dated Oct. 4, 2017.
Guda et al., U.S. Appl. No. 15/826,492, filed Nov. 29, 2017.

* cited by examiner

PARALLEL I/O WRITE PROCESSING FOR USE IN CLUSTERED FILE SYSTEMS HAVING CACHE STORAGE

BACKGROUND

The present invention relates to clustered file systems utilizing cache storage, and more particularly, to parallel I/O write processing in clustered file systems having cache storage.

In a clustered file system which utilizes cache storage, such as IBM's Panache, due to local and network resource restrictions, a dedicated link between a home site and a cache site for a particular fileset may become overloaded. Typical network load balancing solutions will not directly work due to file level dependency and consistency requirements of the clustered file system, and thus other, less heavily-burdened links are not allowed to be used to alleviate the burden on an overloaded link. One possible solution to this problem is to split-up a fileset into two or more child filesets, where each link is given one child fileset to manage. However, it is not possible to utilize the links in such a manner because of an inter-file dependency requirement of clustered file systems. In addition, the link may be overloaded due to heavy traffic corresponding to a single large file, e.g., a large database file of greater than one terabyte. It is not possible to split a single file due to data consistency requirements of clustered file systems (and other file systems).

Another issue is dynamics of file workload may change, thus assigning a first fileset's traffic from a first link to a second link may cause the second link to suffer from being overburdened with the first fileset's traffic when it has heavy application I/Os of its own. Therefore, the challenge is to utilize the first link between the home cite and the cache site for a second fileset's traffic while ensuring across-file and inter-file level consistency and dependency requirements given the limited resources at each gateway node and without affecting the first fileset's traffic. Currently, this causes wastage of network resources, it increases the time required for the home site to be synchronized with the cache site, and results in application latencies and performance degradation.

SUMMARY

In one embodiment, a computer program product includes a computer readable storage medium having program code embodied therewith. The embodied program code is executable by a processor to cause the processor to write, by the processor, data for a first fileset using an owner gateway (GW) node. The embodied program code also causes the processor to determine, by the processor, whether to utilize one or more other GW nodes to handle at least a portion of write traffic for the first fileset. Also, the embodied program code causes the processor to select, by the processor, a set of eligible GW nodes based on at least one of: a current internal workload, a network workload, and recent performance history data in regard to workload distribution across the one or more other GW nodes. In addition, the embodied program code causes the processor to assign and define, by the processor, a size for one or more write task items for each GW node in the set of eligible GW nodes based on a current dynamic profile of each individual GW node in the set of eligible GW nodes. Additionally, the embodied program code causes the processor to provide and/or ensure, by the processor, availability to in-memory and/or input/output (I/O) resources at each GW node in the set of eligible GW nodes to handle one or more assigned write task items. Moreover, the embodied program code causes the processor to distribute, by the processor, workload to the set of eligible GW nodes according to the size for each of the one or more assigned write task items for each individual GW node in the set of eligible GW nodes.

In another embodiment, a method includes using an owner GW node to write data for a first fileset and determining whether to utilize one or more other GW nodes to handle at least a portion of write traffic for the first fileset. The method also includes selecting a set of eligible GW nodes based on at least one of: a current internal workload, a network workload, and recent performance history data in regard to workload distribution across the one or more other GW nodes, and assigning and defining a size for one or more write task items for each GW node in the set of eligible GW nodes based on a current dynamic profile of each individual GW node in the set of eligible GW nodes. Additionally, the method includes providing and/or ensuring availability to in-memory and/or I/O resources at each GW node in the set of eligible GW nodes to handle one or more assigned write task items. Also, the method includes distributing workload to the set of eligible GW nodes according to the size for each of the one or more assigned write task items for each individual GW node in the set of eligible GW nodes.

In another embodiment, a system includes a processor and logic integrated with and/or executable by the processor, the logic being configured to use an owner GW node to write data for a first fileset and determine whether to utilize one or more other GW nodes to handle at least a portion of write traffic for the first fileset via one of: a background process periodically, and a foreground process before initiating a large I/O request according to a predetermined I/O size threshold. The logic is also configured to select a set of eligible GW nodes based on at least one of: a current internal workload, a network workload, and recent performance history data in regard to workload distribution across the one or more other GW nodes. In addition, the logic is configured to assign and define a size for one or more write task items for each GW node in the set of eligible GW nodes based on a current dynamic profile of each individual GW node in the set of eligible GW nodes. Additionally, the logic is configured to provide and/or ensure availability to in-memory and/or I/O resources at each GW node in the set of eligible GW nodes to handle one or more assigned write task items. Moreover, the logic is configured to distribute workload to the set of eligible GW nodes according to the size for each of the one or more assigned write task items for each individual GW node in the set of eligible GW nodes.

Other aspects and embodiments of the present invention will become apparent from the following detailed description, which, when taken in conjunction with the drawings, illustrate by way of example the principles of the invention.

DETAILED DESCRIPTION

Figure 1:
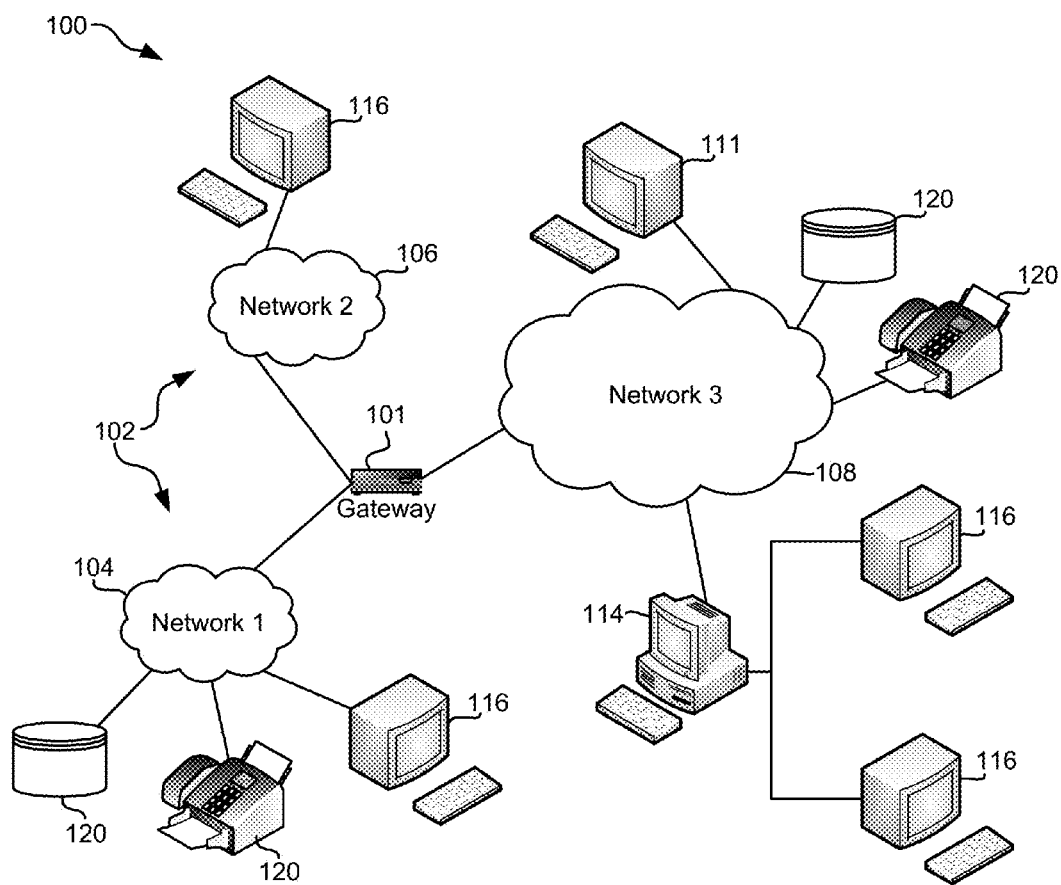
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing parallel input/output (I/O) write processing in clustered file systems having cache storage.

In one general embodiment, a computer program product for providing parallel writing in a clustered file system having cache storage includes a computer readable storage medium having program code embodied therewith, the program code executable by a processor to cause the processor to: write, by the processor, data for a first fileset using an owner gateway (GW) node; determine, by the processor, whether to utilize one or more other GW nodes to handle at least a portion of write traffic for the first fileset; select, by the processor, a set of eligible GW nodes based on at least one of: a current internal workload, a network workload, and recent performance history data in regard to workload distribution across the one or more other GW nodes; assign and define, by the processor, a size for one or more write task items for each GW node in the set of eligible GW nodes based on a current dynamic profile of each individual GW node in the set of eligible GW nodes; provide and/or ensure availability to, by the processor, in-memory and/or I/O resources at each GW node in the set of eligible GW nodes to handle one or more assigned write task items; and distribute, by the processor, workload to the set of eligible GW nodes according to the size for each of the one or more assigned write task items for each individual GW node in the set of eligible GW nodes.

In another general embodiment, a method for providing parallel writing in a clustered file system having cache storage includes using an owner GW node to write data for a first fileset, determining whether to utilize one or more other GW nodes to handle at least a portion of write traffic for the first fileset, selecting a set of eligible GW nodes based on at least one of: a current internal workload, a network workload, and recent performance history data in regard to workload distribution across the one or more other GW nodes, assigning and defining a size for one or more write task items for each GW node in the set of eligible GW nodes based on a current dynamic profile of each individual GW node in the set of eligible GW nodes, providing and/or ensuring availability to in-memory and/or I/O resources at each GW node in the set of eligible GW nodes to handle one or more assigned write task items, and distributing workload to the set of eligible GW nodes according to the size for each of the one or more assigned write task items for each individual GW node in the set of eligible GW nodes.

In another general embodiment, a system includes a processor and logic integrated with and/or executable by the processor, the logic being configured to: use an owner GW node to write data for a first fileset, determine whether to utilize one or more other GW nodes to handle at least a portion of write traffic for the first fileset via one of: a background process periodically, and a foreground process before initiating a large I/O request according to a predetermined I/O size threshold, select a set of eligible GW nodes based on at least one of: a current internal workload, a network workload, and recent performance history data in regard to workload distribution across the one or more other GW nodes, assign and defining a size for one or more write task items for each GW node in the set of eligible GW nodes based on a current dynamic profile of each individual GW node in the set of eligible GW nodes, provide and/or ensure availability to in-memory and/or I/O resources at each GW node in the set of eligible GW nodes to handle one or more assigned write task items, and distribute workload to the set of eligible GW nodes according to the size for each of the one or more assigned write task items for each individual GW node in the set of eligible GW nodes.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
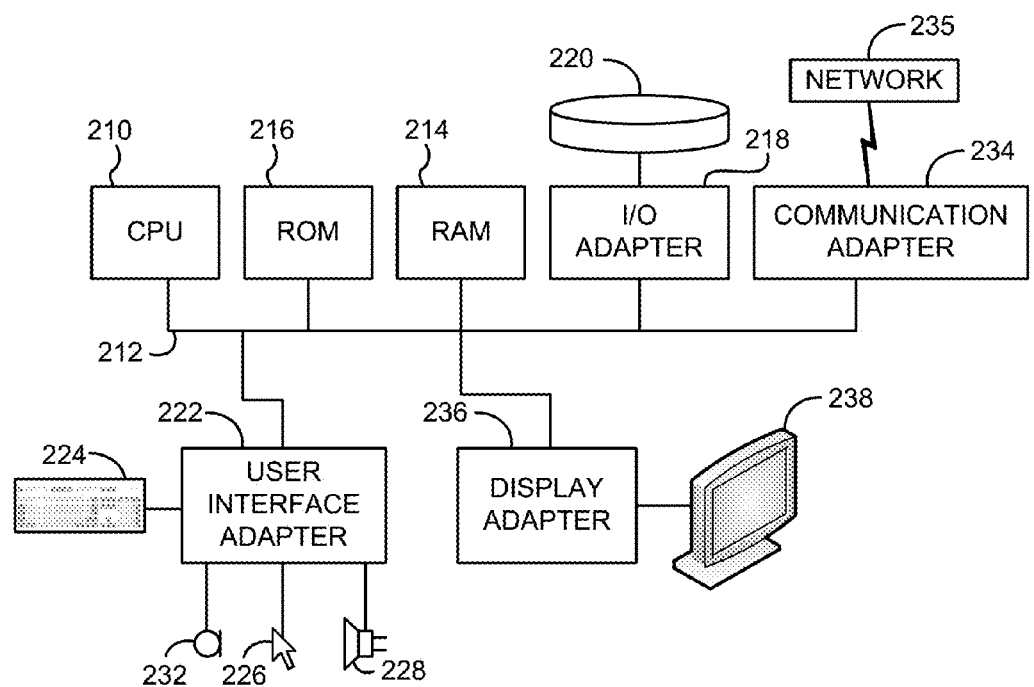
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages.

IBM's clustered file system, Panache, which is also referred to as Active Cloud Engine, is a scalable, high-performance file system caching layer integrated with a parallel-clustered file system, specifically IBM's General Parallel File system (GPFS). It introduces a concept of a persistent data store at a cache site which masks wide-area network latencies and outages by using GPFS to cache massive data sets, allowing data access and modifications even when a remote storage cluster is unavailable.

In Panache terms, the home site is the source of original data and the cache site caches data locally in persistent store for client applications. When a client application tries to access any file, for a first access, the file is fetched from the home site and copied to a parallel-clustered file system, such as a GPFS file system, at the cache site.

Subsequent requests for the file are served from the local cache site eliminating the need and use of bandwidth from the network, such as a WAN. The Panache design takes care of keeping the cache site copy in synchronization with the home site copy. File data is transferred using a protocol where the home site acts as a network file system (NFS) server and the cache site acts as a NFS client. The parallel-clustered file system, such as a GPFS file system, at both sites stores files on the devices managed by the storage server. In order to ensure strong consistency and better adhere to the dependency handling requirement within a file and across dependant files, Panache has a single gateway (GW) node as a point of contact to handle communication with the home site for any operation on a given fileset.

In GPFS terms, logically related files are grouped together under a collection called a "fileset." Panache has various modes based on usage, including a read-only mode, where the cache site is read-only and is not allowed to perform any write operation on the cached files. Panache also has a single-writer mode where the cache site is allowed to perform a write after fetching a first version of a file from the home cache. The home cache is not allowed to perform any write operation, while the cache site is allowed to perform write operations on a local persistent store and these operations are performed asynchronously on the remote side.

At the cache site, an owner gateway node for each fileset is assigned by Panache, with the gateway node being referred to as an "Owner GW Node" thereafter. This node takes responsibility of communications with the home site for the given fileset.

An application (app) node is a node which accesses/performs I/Os on the Panache fileset data, and may be referred to as an "App Node." A gateway node may also be an application node.

For any read operation from an App node, a check is performed to determine whether required data is already available at the local site. When the file is available locally, the App node will read from the local copy and return the data without producing any network traffic with the home site. When the file is not available locally or is available but has not been recently updated, the file will be fetched from the home site. The App node will send a remote read file request to the GW node, and in response, the GW node will fetch the file over the NFS and create a local copy. The App node will access this file copy from this point forward.

For any write operation from the App node, the write operation is first performed on the local site and then queued at the GW node. The GW node periodically synchronizes this modified data to the home site. The Panache architecture takes care of file data synchronization between the cache data and the home data during a disconnection of network links or during long term outages.

Strong data consistency and better dependency requirements are available due to the Panache single GW design. The Panache architecture ensures a strong consistency requirement and better dependency handling at the file level. Distributed locking mechanisms will not scale and/or work in this type of multi-cluster environment due to asynchronous I/O operations and Panache design flexibility configured to handle disconnection of network links or long term outages. The Panache design has a single GW node as a point of contact to handle communications with the home site for any operation on given fileset data. This is to avoid data mismatch in dependency scenarios.

Figure 3:
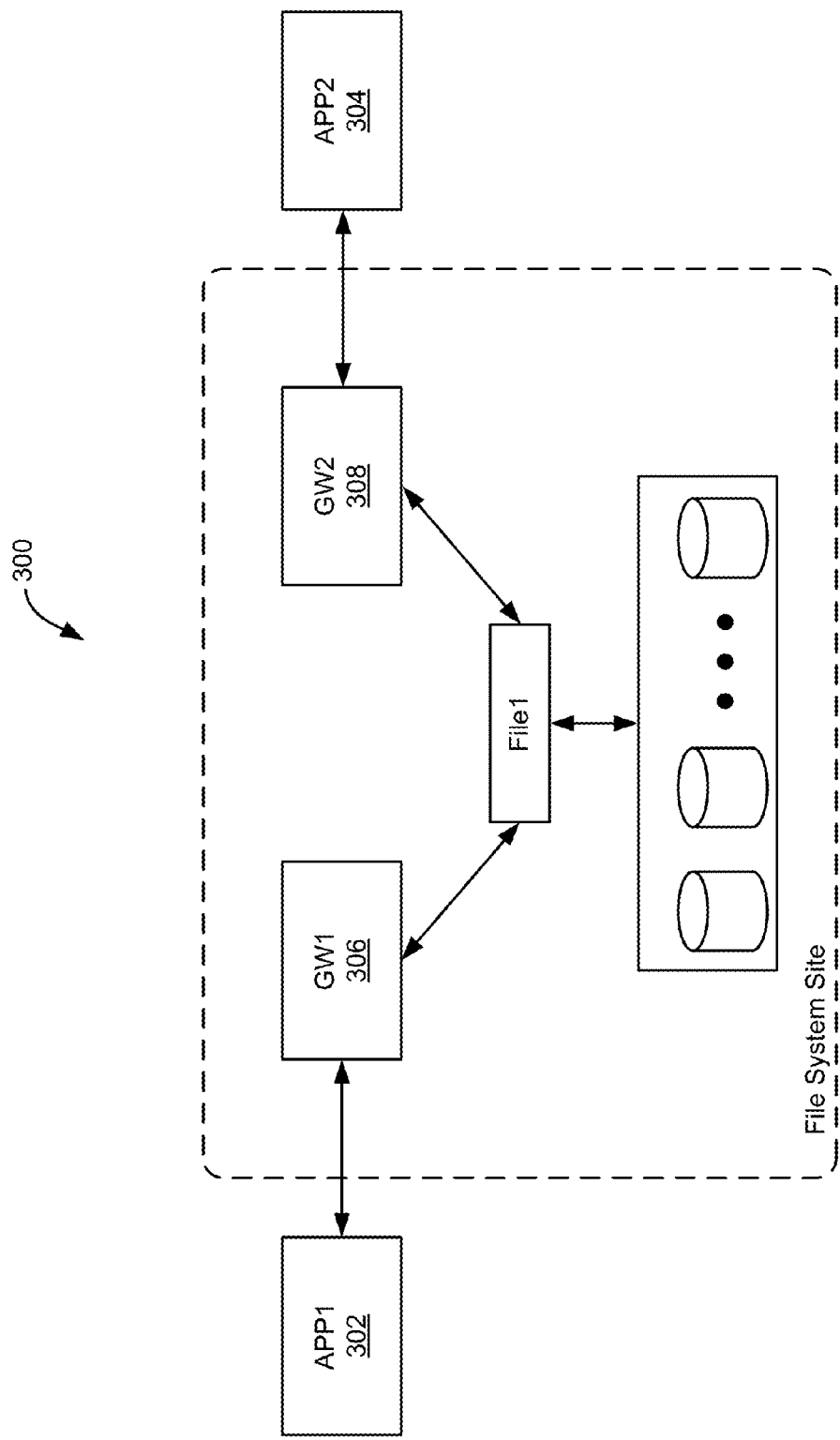
FIG. 3 shows a simplified system diagram according to one embodiment.

Now referring to FIG. 3, a system 300 is shown according to one embodiment. In this system 300, there are two App nodes, APP1 302 and APP2 304, and two gateway nodes GW1 306 and GW2 308, which are handling traffic for the same file, file1. In this setup, some scenarios are described below which may be encountered.

In a first scenario, Scenario 1, the ordering of write operations is discussed. Assume that File1 has a size of 10 bytes. APP1 302 appends 2 bytes, AA, to file1 and sends that request to GW1 306 while APP2 304 appends 2 bytes, BB, to file1 and sends that request to GW2 308. The final condition of file1 should include (Original data+AABB). However, when there are two GW nodes, data might get synchronized based on which GW node writes first. Thus, the final data may be (Original data+AABB) or (Original data+BBAA). This uncertainty is unacceptable.

In a second scenario, Scenario 2, the final write on the same location is discussed. Assume that File1 has a size of 10 bytes. APP1 302 writes AA to location 0 and sends that request to GW1 306 while APP2 304 writes BB to location 0 and sends that request to GW2 308. A locally distributed locking mechanism ensures that the final data is BB. However, on the wire, GW2 308 might finish the write operation before GW1 306. Thus, the final data may be AA. This incorrect write is unacceptable.

In a third scenario, Scenario 3, handling operation dependency for the same files is discussed. APP1 302 creates file1 and sends a corresponding create request to GW1 306 while APP2 304 writes data AA to file1 and sends that write request to GW2 308. A locally distributed locking mechanism takes care of dependency. However, in this scenario, GW2 308 is faster and will try to perform the write operation on the remote copy before GW1 306 performs the create operation. This will result in failure of the write operation at GW2 308. It should be ensured that the creation of file1 is performed before any write operations related to file1 are performed. The failure of the write operation is unacceptable.

In a fourth scenario, Scenario 4, handling operation dependency across files is discussed. APP1 302 creates a directory, dir1, and sends a corresponding create request to GW1 306 while APP2 304 creates file1 inside dir1 and sends a corresponding create request to GW2 308. A locally distributed locking mechanism takes care of dependency but when GW2 308 is faster it will execute the creation of file1 before dir1 is created, which will fail the creation of file 1 remotely.

Besides these scenarios, there are many other scenarios with delete, truncates, appends, read/writes related to operation dependency across files and directories. Filesets are expected to be defined considering these dependency requirements, and a single GW will take care of given fileset traffic with the home site.

Figure 4:
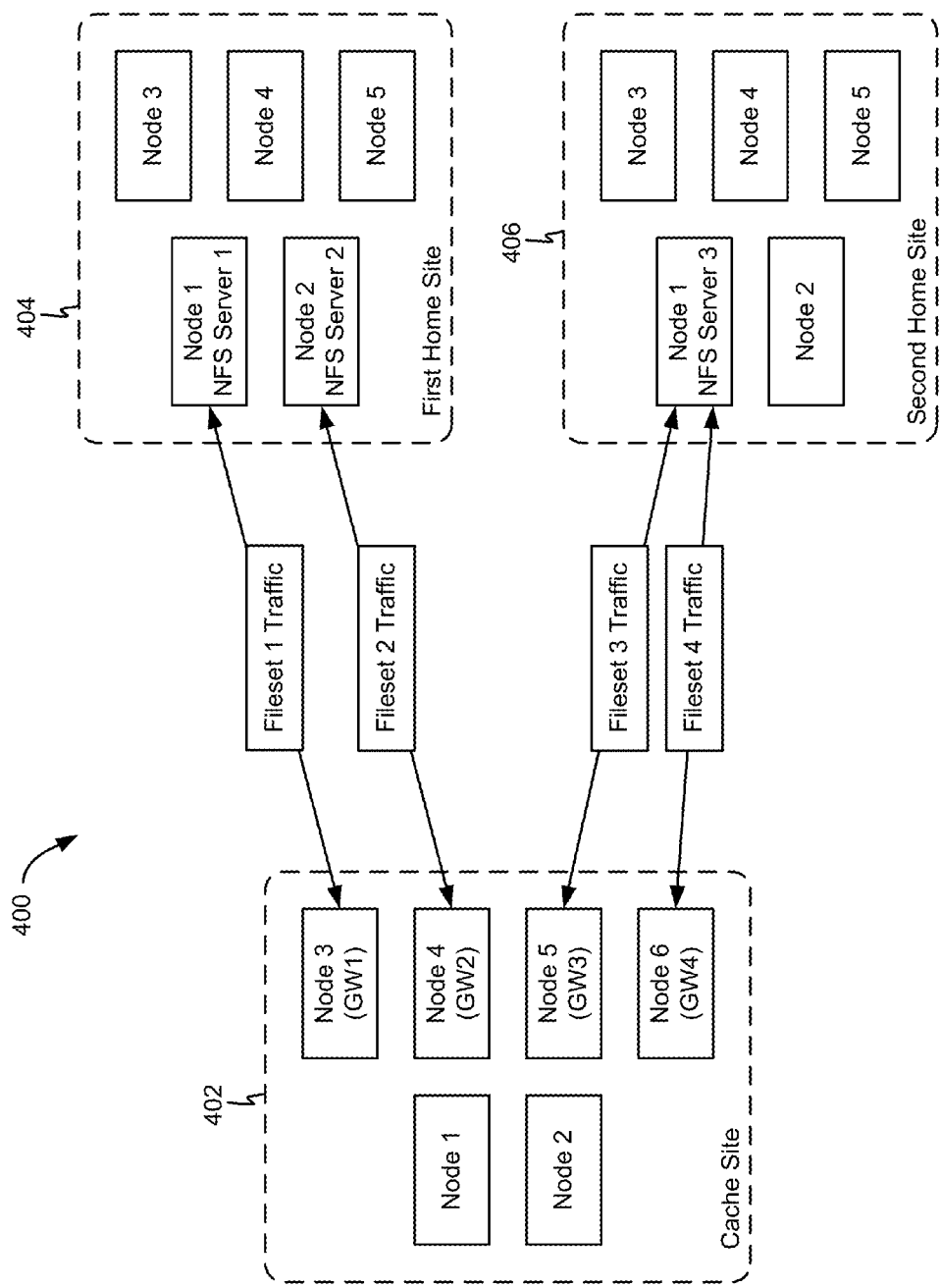
FIG. 4 shows a simplified system diagram according to another embodiment.

In general, in Panache setup, a single cache site may be configured to be in communication with multiple home sites to handle fileset traffic for multiple filesets. As shown in the system 400 in FIG. 4, for Fileset 1 traffic, Node 3 GW1 on the Cache Site 402 interacts with Node 1 NFS Server 1 on the first Home Site 404. For Fileset 2, Node 4 GW2 on the Cache Site 402 interacts with Node 1 NFS Server 2 on the first Home Site 404. For Fileset 3, Node 5 GW3 on the Cache Site 402 interacts with Node 1 NFS Server 1 on the Home Site 406. For Fileset 4, Node 6 GW4 on the Cache Site 402 interacts with Node 1 NFS Server 3 on the Home Site 406. Based on the configuration, each Home Site 404, 406 may have single or multiple NFS servers to handle traffic from the Cache Site 402, e.g., first Home Site 404 has two NFS server nodes, thus they handle traffic for two filesets, separately. Meanwhile, for first Home Site 406, it may have a single NFS server node which handles traffic for both filesets.

Figure 5:
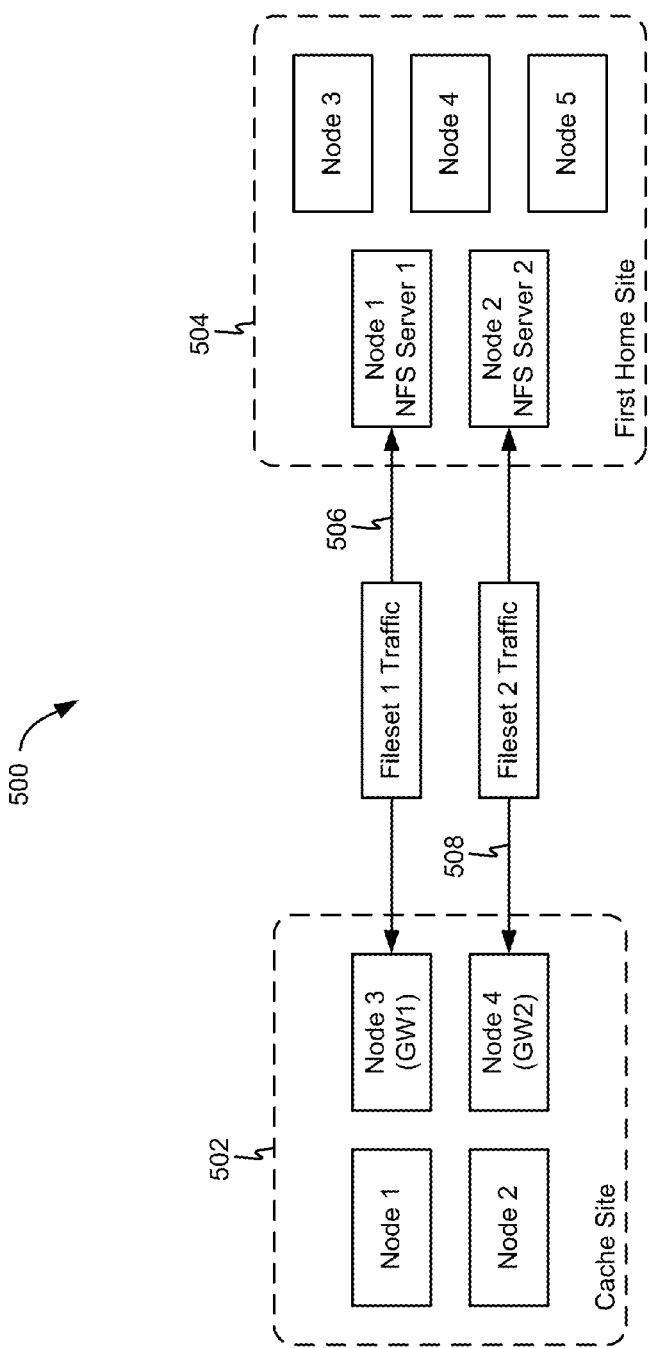
FIG. 5 shows another simplified system diagram according to an embodiment.

As shown in FIG. 5, in this exemplary system 500, Application I/Os may be requesting more often and in greater quantities for Fileset 2 compared to Fileset 1. Thus, there is relatively less traffic for Fileset 1 on Link 1 506 between GW1 at the Cache Site 502 and the NFS Server on Node 1 at the First Home Site 504. Therefore, Link 1 506 is under-utilized. Meanwhile, for Fileset 2, Link 2 508, between GW2 at the Cache Site 502 and the NFS Server Node 2 at the First Home Site 504, is over-utilized and needs more bandwidth due to the relatively greater demand for Fileset 2 on Link 2 508.

Due to local and network resource restrictions, GW2 at the Cache Site 502 may become overloaded trying to accommodate all the requests for Fileset 2 and the accompanying traffic. Typical network-load balancing solutions will not directly work due to file level dependency and consistency requirements and thus Link 1 506 may not be used directly for Fileset 2 traffic.

In order to overcome this deficiency, according to one embodiment, best utilization of available network resources between the home site and the cache site of a high-performance file system caching layer integrated with a parallel-clustered file system, such as Panache, may be ensured. In this way, for a given fileset, when a link between the fileset's owner GW node and the home site is overloaded and there are other GW nodes available at the cache site to handle communication with the given home site, a link for one of the other GW nodes may be utilized for traffic of the given fileset considering the following principles.

Dynamic network and local resource profile of gateway nodes is utilized. This dynamic network and local resource profile is enacted with no compromise on dependency and strong consistency requirements at the file level or across dependant operations across multiple files according to one embodiment. Furthermore, performance benefits are ensured in this scheme due to task delegation, and no performance degradation is observed on other fileset traffic.

This dynamic network and local resource profile of gateway nodes is particularly useful in a high-performance file system caching layer integrated with a parallel-clustered file system, where two multi-node cluster sites may communicate with each other for caching/replication purposes using a file operation level data transfer protocol. In this environment, the file system data is distributed into multiple filesets where each fileset is created while taking into consideration file access and dependency requirements. A single large file or set of dependant files may be under heavy I/O workload, distributed file locking mechanisms are not useful across cluster environments due to WAN latencies and disconnection, and network outage issues. Communication on the link is performed at the granularity of the fileset level where an existing mechanism prefers a single GW node design as a communication end point for given fileset traffic.

Also, in this environment, splitting of data I/O on a single file or dependant files across multiple node links is not easily possible due to data consistency and dependency requirements at the file level and across multiple files. During heavy I/O load on GW node, it is not directly possible to further split filesets at the granularity of the file or file chunk level due to operation consistency and dependency requirements.

Figure 6:
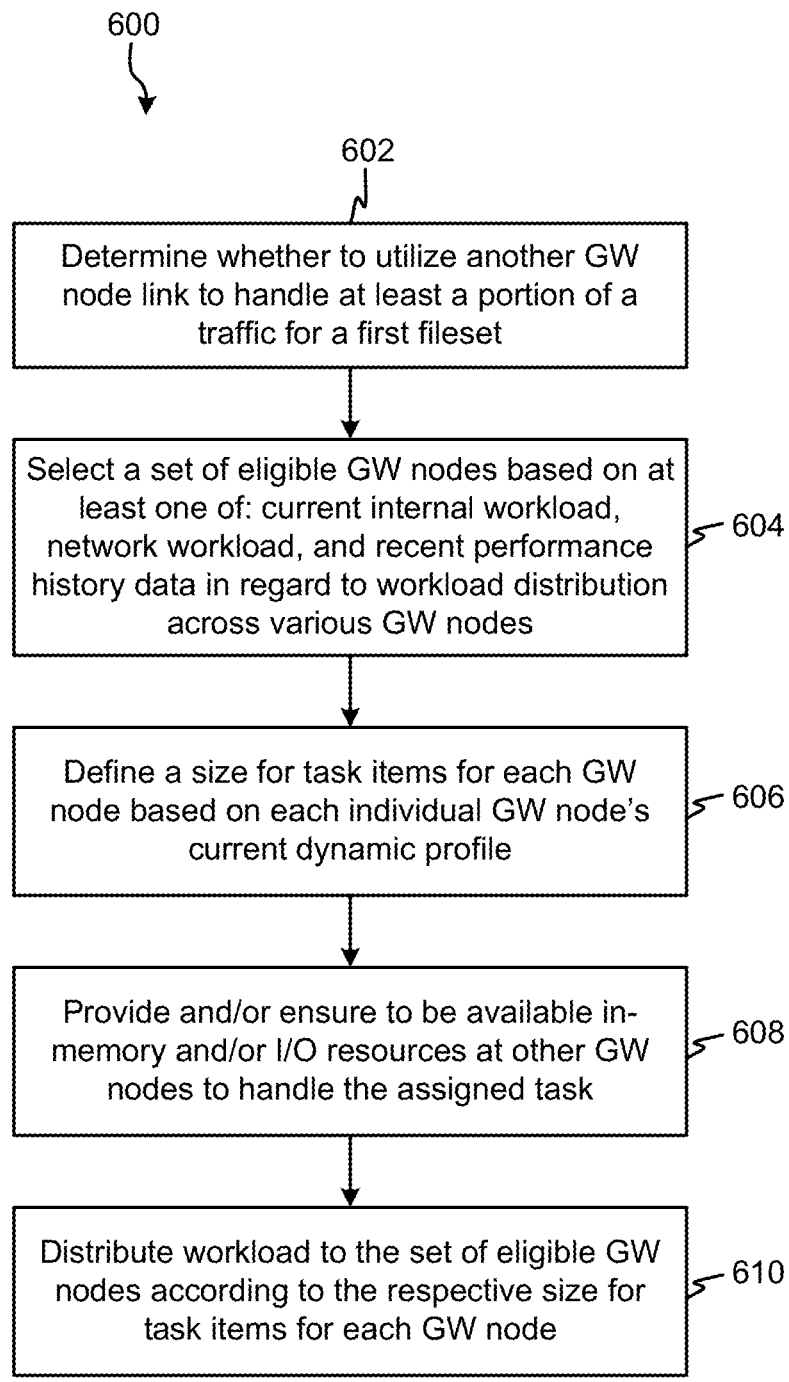
FIG. 6 shows a flow chart of a method according to one embodiment.

In one embodiment, referring to FIG. 6 a method 600 is presented to solve these problems. The method 600 may be executed by a system using a processor which is configured to execute or otherwise cause the execution of embedded or standalone logic (which may be hardware, software, or a combination thereof) according to one embodiment. In another embodiment, the method 600 may be executed by a computer program product which comprises a computer readable storage medium having computer program code stored therein.

The method 600 may be performed in accordance with the present invention in any of the environments depicted in FIGS. 1-5, and 7 among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a host, a server, a router, a switch, a switch controller (such as a software defined network (SDN) controller, an OpenFlow controller, etc.), a processor, e.g., a CPU, an application specific integrated circuit (ASIC), a field programmable gate array (FPGA), etc., one or more network interface cards (NICs), one or more virtual NICs, one or more virtualization platforms, or any other suitable device or component of a network system, cluster, or group of clusters.

In operation 602, it is determined whether to utilize another GW node link to handle at least a portion of a traffic for a first fileset. This decision may be based on one or more of the following: a configuration of the network between the home site and the cache site meeting a set of predefined criteria, and a current GW being overloaded for the first fileset traffic and the another GW being capable of being utilized (has available bandwidth) per the predefined criteria. In one embodiment, both of these criteria must be met in order for another GW node link to be used to handle some or all of the traffic for a first fileset.

According to one embodiment, this determination may be performed as a background process, possibly periodically and/or in response to some event or trigger. In yet another embodiment, this determination may be performed as a foreground process before initiating a large I/O, according to some predetermined I/O size threshold.

In one embodiment, the amount of workload at an owner GW node for the first fileset may be determined based on one or more of the following: an amount of data present in I/O requests that are queued for the first fileset, an amount of data in outstanding I/O requests on the wire (issued and/or received, but not yet completed) for the first fileset, an I/O workload at one or more other GW nodes due to traffic from one or more other filesets, and an I/O workload at the one or more other GW nodes that are functioning as an App node serving local applications.

According to another embodiment, a similar workload check may be performed for other GW nodes which have connectivity with the given home site. This workload check may be performed at the owner GW node for the first fileset. Furthermore, in various embodiments, the workload check may be performed as a background I/O workload monitoring thread periodically checking the workload, during a start of a sufficiently large I/O operation based on the I/O size. In this embodiment, an administrator or some other suitable application or system may configure a predetermined threshold to determine whether an amount of I/O qualifies as "large."

In operation 604, a set of eligible GW nodes are selected based on at least one of: current internal workload, network workload, and recent performance history data in regard to workload distribution across various GW nodes.

According to one embodiment, performance history data in regard to workload distribution across various GW nodes may include recent I/O performance history for each GW node. This may be based on I/O performance, time taken to perform past assigned tasks, and/or I/O failures for one or more past assigned tasks.

In one embodiment, the GW node set may be selected in order to ensure that all GW nodes included therein are eligible to have task items delegated thereto based on a dynamic profile for each GW node determined from at least one of: I/O workload for the first fileset, I/O workload for other filesets (besides the first fileset), network workload for the first fileset, and network workload for the other filesets.

In operation 606, a size for task items for each GW node is defined based on each individual GW node's current dynamic profile.

In operation 608, in-memory and/or I/O resources at other GW nodes are provided and/or ensured to be available to handle the assigned task.

In operation 610, workload is distributed to the set of eligible GW nodes according to the respective size for task items for each GW node.

According to another embodiment, a given I/O task may be split among the selected GW node set and distribution of the given I/O task to the set of GW nodes may be based on each individual GW node's dynamic profile.

In various embodiments, method 600 may include ensuring strong consistency while performing I/O tasks across the multiple GW nodes. This may be accomplished by any of the following, alone or in combination: two level co-coordinators that are configured to track I/O tasks, tracking task item progress, orphan task handling during error scenarios, and/or error handling at multiple links.

According to one embodiment, the two level co-coordinators may include a central coordinator thread to track tasks assigned by a background I/O workload monitoring thread. For large I/O tasks assigned in the foreground, a respective foreground thread may perform the coordination necessary to ensure consistency.

In one embodiment, the coordinator threads perform one or more of the following tasks: handling I/O and/or network errors associated with GW nodes and reassigning tasks to other suitable GW nodes from the selected GW node list, ensuring that each GW node is making progress toward completing each assigned task item, blocking conflicting I/Os before completion of an assigned I/O and maintaining a consistent data image for any I/O request from an App node, ensuring the correct version of data transfer at each GW node across multiple versions of the same data (e.g., for snapshots), and tracking and removing orphaned tasks that have already been assigned to another GW node due to failure of a previously assigned or owner GW node.

In more embodiments, method 600 may include dynamic smart tuning of configuration variables and/or parameters for better gain in performance over conventional multi-cluster parallel systems. In one embodiment, one or more parameters may be used to tune in-memory and/or I/O resources at each of the GW nodes, while one or more parameters may be used to tune performance on the various network links. This dynamic smart tuning is performed to ensure better I/O performance, and may be performed for one, some, or all GW nodes.

In one embodiment, the dynamic smart tuning may include tuning of one or more internal in-memory resources and tuning of one or more network parameters. The internal in-memory resources may include one or more of: a number of in memory I/O processing threads, an in-memory buffer management to store data I/O, a suitable I/O buffer size for better data transfer, managing NFS remote procedure call (RPC) slots, a transmission control protocol (TCP) congestion window size, and worker threads at the NFS server nodes, among other parameters known in the art.

Figure 7:
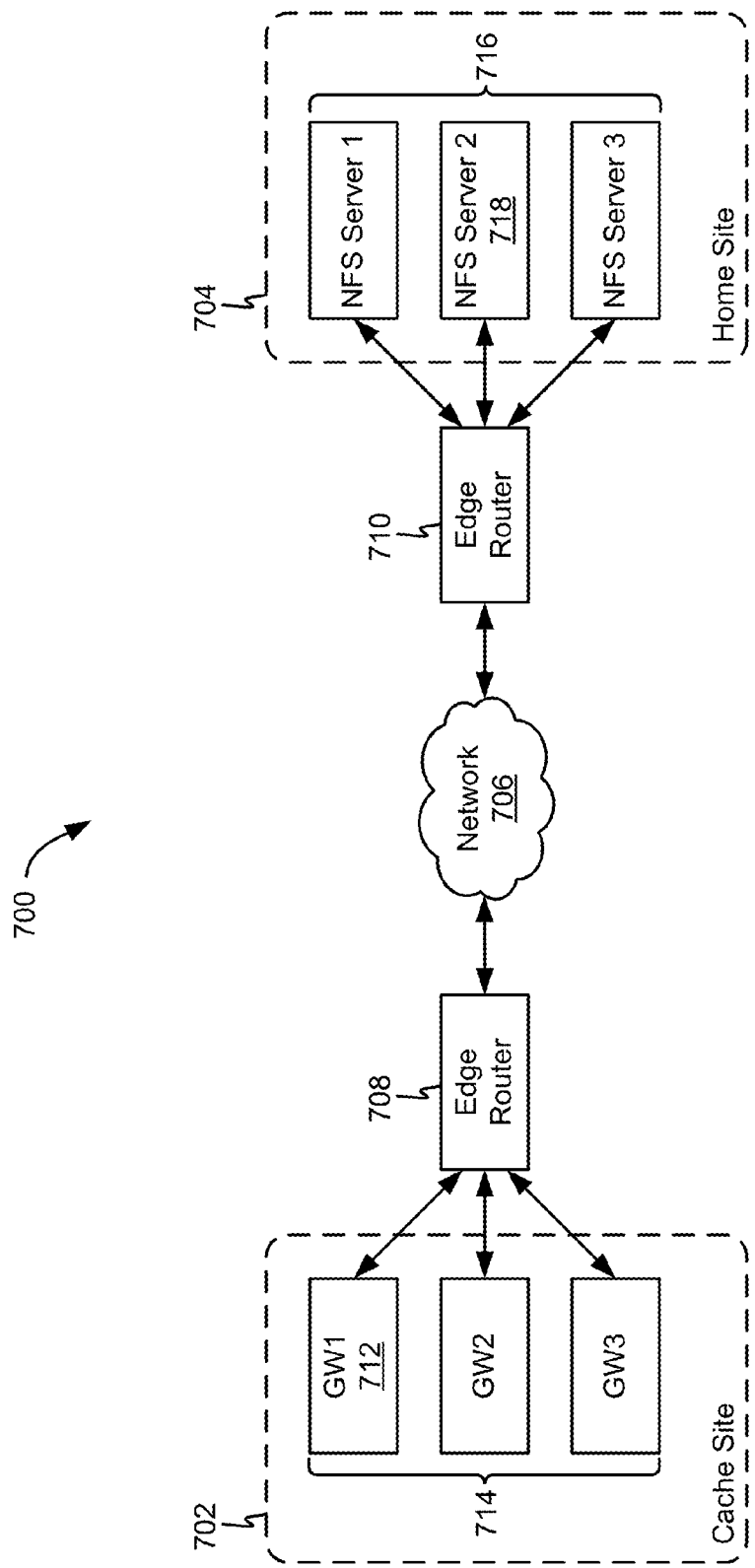
FIG. 7 shows a simplified system diagram according to one embodiment.

Now referring to FIG. 7, a system 700 is shown according to one embodiment. In this system 700, a cache site 702 is in communication with a home site 704. A network 706, such as a WAN, is provided therebetween to transmit the communications therebetween, with the cache site 702 being connected to the network 706 via a cache site edge router 708 and the home site 704 being connected to the network 706 via a home site edge router 710. Each router is configured to handle outgoing traffic for its respective home site 704 or cache site 702.

In order to be able to utilize method 600 shown in FIG. 6 on the system 700 shown in FIG. 7, the following setup criteria should be satisfied, otherwise the method may not be beneficial and/or may not function properly, under various circumstances. First, the network bandwidth between the cache site edge router 708 and the home site edge router 710 is greater than the bandwidth between a particular GW node, such as GW1 712, of the home site 704 and the cache site edge router 708. Second, the aggregate read bandwidth of the home site 704 is greater than the end-to-end network bandwidth between a single GW node 714 of the cache site 702 and one of the home site NFS servers 716. Third, the aggregate write bandwidth of the cache site 702 is larger than the end-to-end network bandwidth between a single GW node 714 of the cache site 702 and one of the home site NFS servers 716. For read operations, each GW node 714 at the cache site 702 is connected to a unique home site NFS server, such as NFS Server 2 718, to avoid randomness increases. These randomness increases have been observed in single NFS server GPFS open instance implementations, along with decreases in read-ahead and local pre-fetch benefits.

In the context of the flowcharts shown in FIGS. 8-11, the following tables may be maintained for use in computations, calculations, and/or reference by components in a system executing the various methods.

Table 1 is a GW node home link information table, and may be maintained per each cache site. Table 1 stores information about connectivity of each GW node with possible home sites and respective I/O bandwidth information. A missing entry for a given GW node indicates that there is no connectivity of that GW node with a given home site. An example of Table 1 is shown below according to one exemplary embodiment.

TABLE 1

| Home site | Home NFS Server Node | GW Node | Available Bandwidth (MB/s) |
|---|---|---|---|
| HomeSite1 | HomeNode1 | Node1 | 100 |
|  | HomeNode2 | Node2 | 100 |
| HomeSite2 | HomeNode1 | Node1 | 100 |
|  | HomeNode1 | Node2 | 100 |

TABLE 1-continued

| Home site | Home NFS Server Node | GW Node | Available Bandwidth (MB/s) |
|---|---|---|---|
| HomeSite3 | HomeNode1 | Node1 | 100 |
|  | HomeNode1 | Node2 | 50 |
|  | HomeNode2 | Node2 | 50 |
|  | HomeNode2 | Node3 | 100 |

Another table, Table 2, which may be used to maintain application I/O statistics for each GW node at a cache site, is also described. Table 2 may be updated at regular time intervals, in response to some event occurring, or according to any other method known in the art. An example of Table 2 is shown below according to one exemplary embodiment.

TABLE 2

| GW Node | I/O Statistics (MB/s) |
|---|---|
| GW1 | 200 |
| GW2 | 400 |
| GW3 | 300 |

Table 2 may be used to store how much I/O is performed by the application on each GW node directly. Of course, other types of data constructs may be used to store the information presented in any of the tables described herein, as would be known to one of skill in the art.

Figure 8:
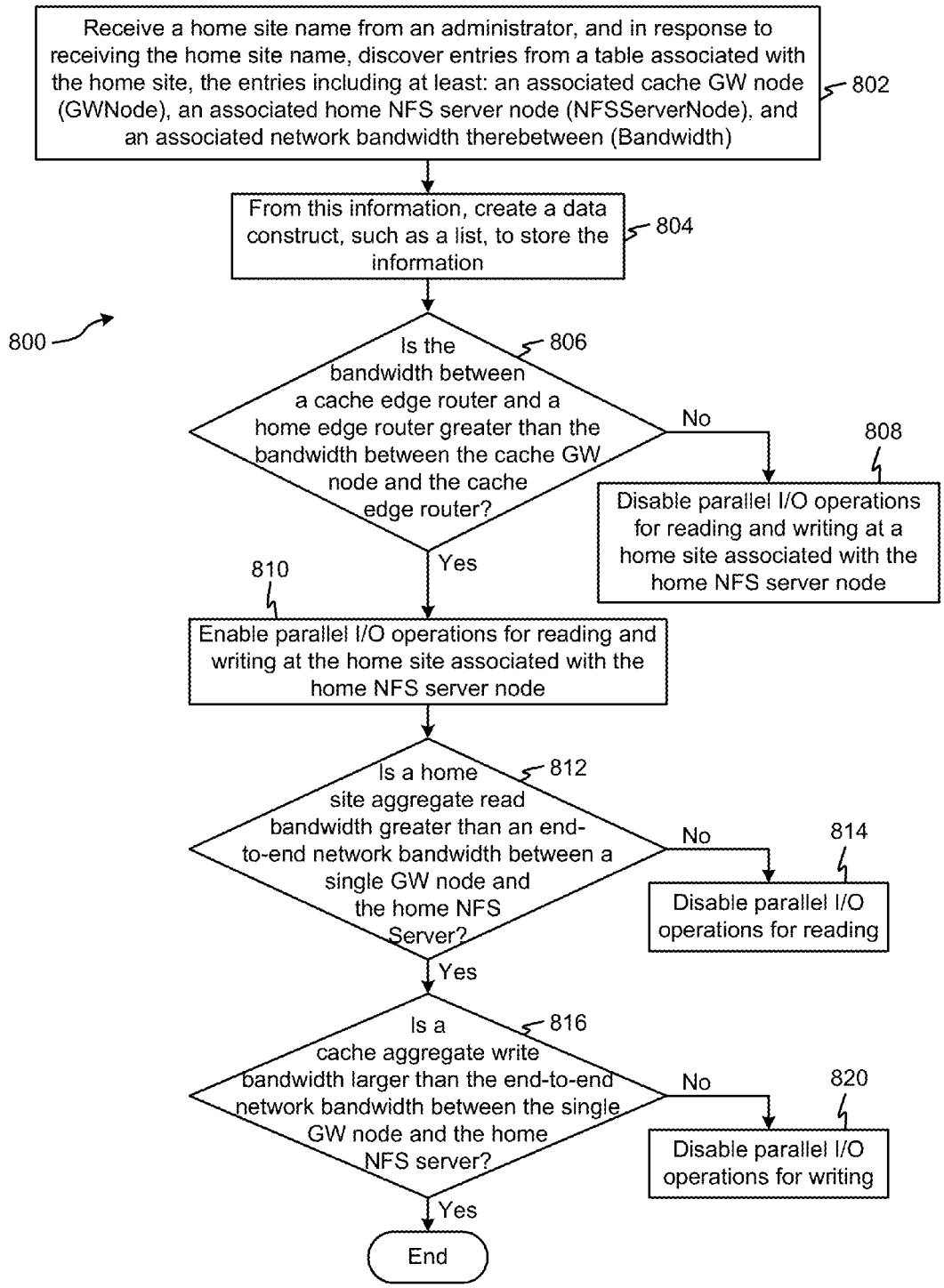
FIG. 8 shows a flow chart of a method according to one embodiment.

In one embodiment, referring to FIG. 8 a method 800 is presented to determine eligibility to perform a parallel I/O write. The method 800 may be executed by a system using a processor which is configured to execute or otherwise cause the execution of embedded or standalone logic (which may be hardware, software, or a combination thereof) according to one embodiment. In another embodiment, the method 800 may be executed by a computer program product which comprises a computer readable storage medium having computer program code stored therein.

The method 800 may be performed in accordance with the present invention in any of the environments depicted in FIGS. 1-5, and 7 among others, in various embodiments. Of course, more or less operations than those specifically described in FIG. 8 may be included in method 800, as would be understood by one of skill in the art upon reading the present descriptions.

In operation 802, a home site name is received from an administrator or some other suitable source for such information known in the art. In response to receiving the home site name, entries from a table associated with the home site are discovered, the entries including at least: an associated cache GW node (GWNode), an associated home NFS server node (NFSServerNode), and an associated network bandwidth therebetween (Bandwidth).

In optional operation 804, from this information, a data construct is created to store the information. In one embodiment, the data construct may be in the form of a list having the following format: <GWNode, NFSServerNode, Bandwidth>. Of course, any other format and data construct may be used as would be apparent to one of skill in the art.

In operation 806, it is determined whether the network bandwidth between a cache edge router and a home edge router is greater than the bandwidth between the cache GW node and the cache edge router. In one embodiment, the data construct may be used to make this determination. When it is greater, method 800 continues to operation 810; otherwise, method 800 continues to operation 808 and ends.

In operation 808, parallel I/O operations for reading and writing is disabled at a home site associated with the home NFS server node, and method 800 ends.

In operation 810, parallel I/O operations for reading and writing is enabled at the home site associated with the home NFS server node.

In operation 812, after parallel I/O operations for reading and writing are enabled, it is determined whether a home site aggregate read bandwidth is greater than an end-to-end network bandwidth between a single GW node and the home NFS server. In one embodiment, the data construct may be used to make this determination. When it is greater, method 800 continues to operation 816; otherwise, method 800 continues to operation 814.

In operation 814, parallel I/O for reading is disabled at the home site associated with the home NFS server node. Then, method 800 continues to operation 816.

In operation 816, it is determined whether a cache aggregate write bandwidth is larger than the end-to-end network bandwidth between the single GW node and the home NFS server. In one embodiment, the data construct may be used to make this determination. When it is greater, parallel I/O for reading and writing is maintained and method 800 ends; otherwise, method 800 continues to operation 820 and ends.

In operation 820, parallel I/O for writing is disabled at the home site associated with the home NFS server node, and method 800 ends.

Accordingly, method 800 determines whether to perform parallel I/O operations for reading, writing, both reading and writing, or neither. Method 800 may be combined with any other method described herein in order to more fully dictate control over parallel I/O operations in a parallel I/O module or some other component of a data storage system.

Figure 9:
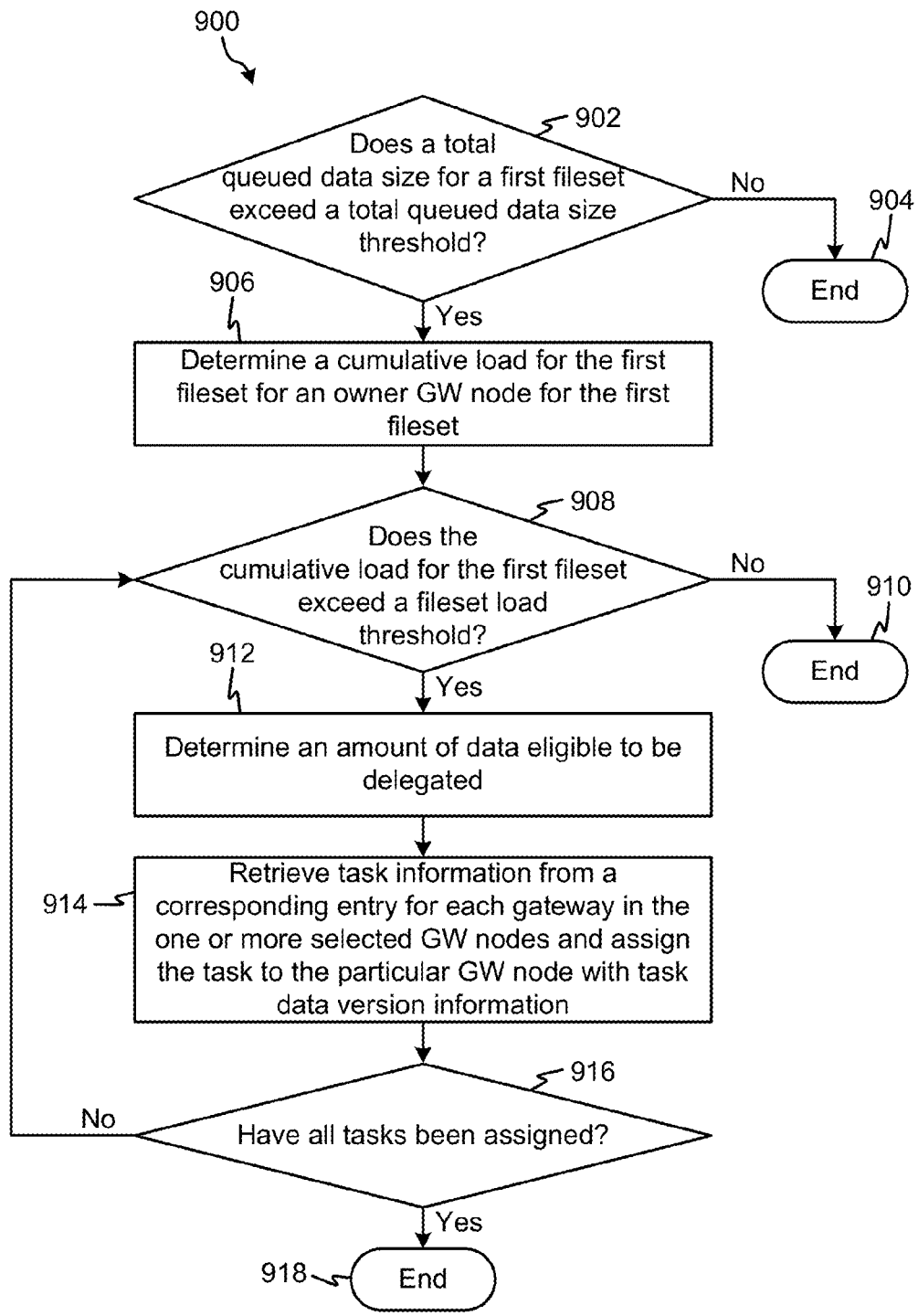
FIG. 9 shows a flow chart of a method according to another embodiment.

Now referring to FIG. 9 a method 900 is presented to perform a background task split at an owner GW node, according to one embodiment. The method 900 may be executed by a system using a processor which is configured to execute or otherwise cause the execution of embedded or standalone logic (which may be hardware, software, or a combination thereof) according to one embodiment. In another embodiment, the method 900 may be executed by a computer program product which comprises a computer readable storage medium having computer program code stored therein.

The method 900 may be performed in accordance with the present invention in any of the environments depicted in FIGS. 1-5, and 7 among others, in various embodiments. Of course, more or less operations than those specifically described in FIG. 9 may be included in method 900, as would be understood by one of skill in the art upon reading the present descriptions.

In operation 902, it is determined whether a total queued data size for a first fileset exceeds a total queued data size threshold. This determination may be based on parallel reading and/or writing being enabled and certain queued I/O types which invokes a background task split process to periodically check the total queued data size for the first fileset, in one embodiment.

In operation 904, when the total queued data size for the first fileset does not exceed the total queued data size threshold, method 900 ends.

In operation 906, a cumulative load for the first fileset is determined, calculated, retrieved, and/or received for an owner GW node for the first fileset. In one embodiment, a first formula may be used to determine this cumulative load for the first fileset.

In one embodiment, the first formula may include the following operations.

ThisFilesetQueuedData=
Fileset1 queued data from Table 3 of GW1
ThisFilesetOutStandingData=
Fileset1 outstanding data from Table 3 of GW1
OtherFilesetQueuedData=
Sum of all filesets queued data from Table 3 of GW1 except Fileset1
OtherFilesetOutStandingData=
Sum of all outstanding data from Table3 of GW1 except Fileset1
AppIOWorkload=
IO workload for given GW from Table2
LoadDueToThisFileset=
a1*ThisFilesetQueuedData+
 a2*ThisFilesetOutStandingData
LoadDueToOtherFileset=
b1*OtherFilesetQueuedData+
 b2*OtherFilesetOutStandingData
CumulativeLoadForThisFileset=
A*LoadDueToThisFileset+B*LoadDueToOtherFileset+
 C*AppIOWorkload (where a1, a2, b1, b2, A, B, and C are system defined parameters)
return CumulativeLoadForThisFileset.

Table 3 of GW1 may be a table or some other data storage construct which shows the per Fileset remote I/O for a single GW node. This table is maintained at each GW node, and it stores remote I/O statistics for the given GW node. In one embodiment, Table 3 may include fileset names handled at the GW node, an amount of data pending and/or queued for each fileset (in GB or some other unit of measure), and an amount of data outstanding for each fileset (in GB or some other unit of measure). For example, Table 3 of GW1 may appear as shown in the exemplary embodiment below.

TABLE 3

| Fileset | Amount of Data Pending/Queued (GB) | Amount of Data Outstanding (GB) |
|---|---|---|
| Fileset1 | 10 | 5 |
| Fileset2 | 20 | 2 |
| Fileset3 | 0 | 0.5 |

The second column for the amount of data pending and/or queued for each fileset is updated whenever a data request is received. The third column for the amount of data outstanding for each fileset is updated when a data request is transferred on the wire. In the exemplary embodiment of Table 3, Fileset3 shows less data at this GW node, because this GW node is not the owner of Fileset3.

In operation 908, it is determined whether the cumulative load for the first fileset exceeds a fileset load threshold. When it does exceed the threshold, method 900 continues to operation 912; otherwise, method 900 ends at operation 910.

In operation 912, an amount of data eligible to be delegated (AmountOfDataEligibleToDelegate) is determined, calculated, retrieved, and/or received. With this information, one or more GW nodes are selected with a weighting or percentage (SelectedGW-TaskList) associated with each indicating an amount of data to share with these GW nodes.

In one embodiment, a second formula may be used to calculate the amount of data eligible to be delegated, as shown below.

GW1 is the owner for Fileset1
TotalAmountOfData=
Amount of outstanding data for Fileset1
PeerGWList=
List of GW nodes eligible for delegation from Table1 with connectivity with GW nodes. For reads, each GW has a unique home server.
CumulativeLoadForThisFileset=
Determined using the first formula from GW1 and Fileset1
AmountOfDataEligibleToDelegate=
TotalAmountOfData−E*CumulativeLoadForThisFileset
SelectedGWList=
Initialize empty list to delegate nodes from GW
SumEigibilityValue=0
// store sum of eligibility value for selected GW nodes
SelectGW-WeightList=
Empty list to store <Peer GW Node, WeightValue>

Then, for each GW-X from PeerGWList, the following calculations may be executed.

```
For each GW-X from PeerGWList.
{
  Use the second formula to determine its PeerGWEligibilityValue for
  Fileset1.
  If value is greater than MinEligibilityThreshold, add GW-X to
  SelectedGWList.
}
For each GW-X from SelectedGWList
{
  SumEigibilityValue = PeerGWEligibilityValue for GW-X for Fileset1
}
For each GW-X from SelectedGWList,
{
  Weight of GW-X = (PeerGWEligibilityValue for GW-X) /
  SumEigibilityValue.
  Add tuple <GW-X,Weight of GW-X> to the SelectGW-WeightList.
}
  return AmountOfDataEligibleToDelegate and SelectGW-WeightList
```

In another embodiment, a third formula may be used to calculate the weighting or percentage, as shown below.

Receive AmountOfDataEligibleToDelegate and SelectGW-WeightList as inputs from the second formula
remainingDataSize=AmountOfDataEligibleToDelegate
Create copy of SelectGW-WeightList as UnMarkedSelectGW-WeightList
Create SelectedGW-TaskList to store GW node with associated task information Then, while remainingDataSize is non-zero or all GW have been finished, the following calculations may be executed.

```
{
  If there is single GW-X remaining in UnMarkedSelectGW-WeightList:
  {
    Assign remainingDataSize task item to this GW-X.
    Remove GW-X from UnMarkedSelectGW-WeightList.
    Add GW-X to the SelectedGW-TaskList along with
    remainingDataSize task information.
    Break the loop.
  }
  Select first GW-X from UnMarkedSelectGW-WeightList
  LetWt-X be its weight value,
    currentTaskSize = Wt-X * AmountOfDataEligibleToDelegate
```

```
  if (currentTaskSize > remainingDataSize)
  {
    Add GW-X to the SelectedGW-TaskList along with
    remainingDataSize task information.
    Break the loop.
  }
  reAdjustedCurrentTaskSize = Updated currentTaskSize to ensure
  parallel IO chunk size, file-system block boundary, file boundary.
  Add GW-X to the SelectedGW-TaskList along with
  reAdjustedCurrentTaskSize task information.
  Remove GW-X from UnMarkedSelectGW-WeightList
  remainingDataSize = remainingDataSize − reAdjustedCurrentTaskSize
}
return SelectedGW-TaskList
```

In operation 914, for each gateway in the one or more selected GW nodes, task information is retrieved from a corresponding entry and a corresponding task is assigned to the particular GW node with task data version information.

In operation 916, it is determined whether all tasks have been assigned. When all tasks have been assigned, method 900 completes in operation 918; otherwise, method 900 returns to operation 908 to repeat some of the operations.

In operation 918, method 900 ends as all tasks have been completed.

Accordingly, method 900 provides for a background split of processes (tasks) at the owner GW node for a particular fileset. Method 900 may be combined with any other method described herein in order to more fully dictate control over parallel I/O operations in a parallel I/O module or some other component of a data storage system.

Figure 10:
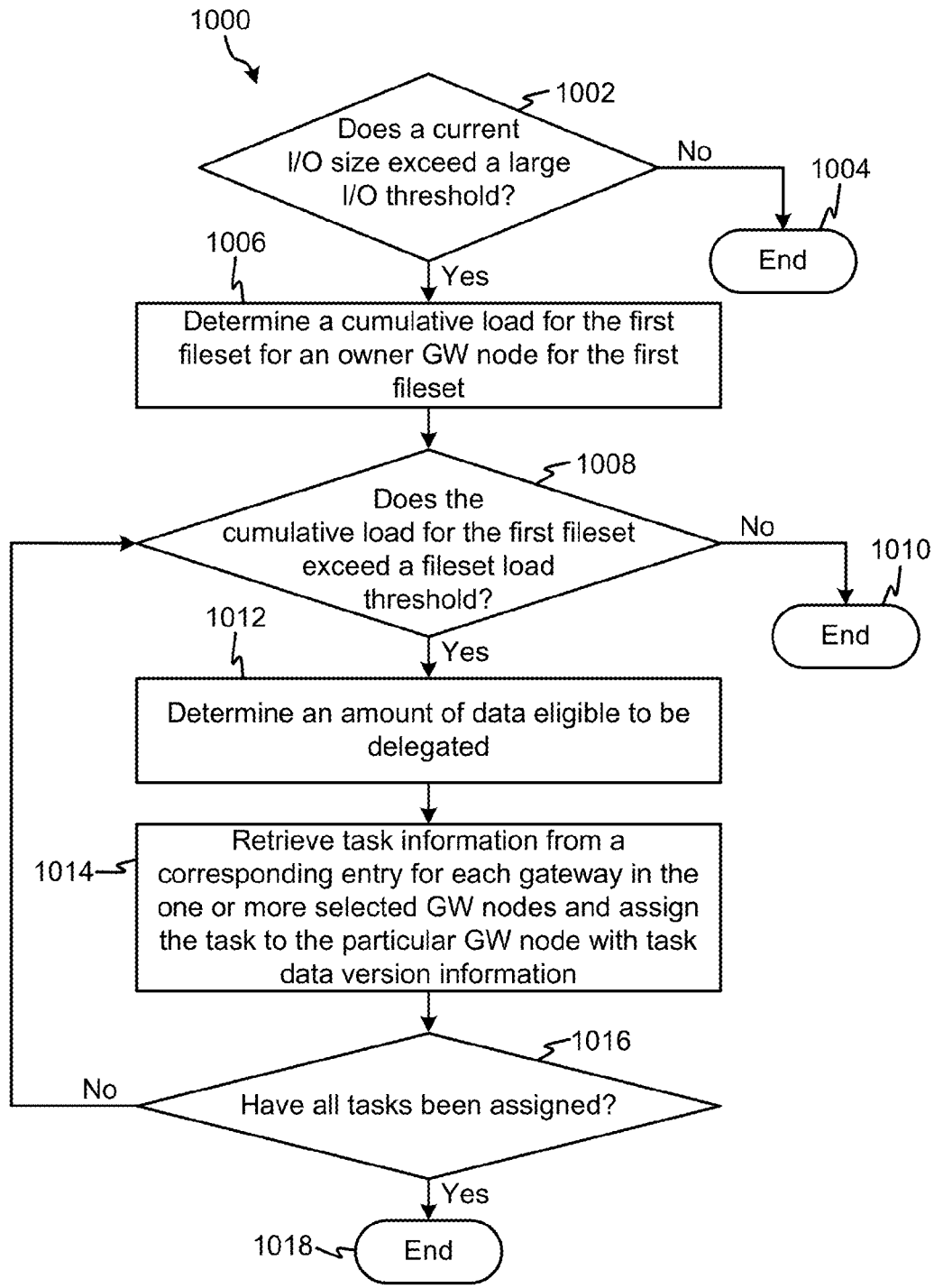
FIG. 10 shows a flow chart of a method according to yet another embodiment.

Now referring to FIG. 10 a method 1000 is presented to perform a foreground task split at an owner GW node, according to one embodiment. The method 1000 may be executed by a system using a processor which is configured to execute or otherwise cause the execution of embedded or standalone logic (which may be hardware, software, or a combination thereof) according to one embodiment. In another embodiment, the method 1000 may be executed by a computer program product which comprises a computer readable storage medium having computer program code stored therein.

The method 1000 may be performed in accordance with the present invention in any of the environments depicted in FIGS. 1-5, and 7 among others, in various embodiments. Of course, more or less operations than those specifically described in FIG. 10 may be included in method 1000, as would be understood by one of skill in the art upon reading the present descriptions.

In operation 1002, it is determined whether a current I/O size exceeds a large I/O threshold. This determination may be based on parallel reading and/or writing being enabled and a current I/O type which invokes a foreground task split process to check the size of the I/O task prior to start of the I/O operation, in one embodiment In operation 1004, when the current I/O size does not exceed the large I/O threshold, method 1000 ends.

In operation 1006, a cumulative load for the first fileset is determined, calculated, retrieved, and/or received for an owner GW node for the first fileset. In one embodiment, the first formula (described previously) may be used to determine this cumulative load for the first fileset.

In operation 1008, it is determined whether the cumulative load for the first fileset exceeds a fileset load threshold. When it does exceed the threshold, method 1000 continues to operation 1012; otherwise, method 1000 ends at operation 1010

In operation 1012, an amount of data eligible to be delegated (AmountOfDataEligibleToDelegate) is determined, calculated, retrieved, and/or received, with the current I/O size as an input. With this information, one or more GW nodes are selected with a weighting or percentage (SelectedGW-TaskList) associated with each indicating an amount of data to share with these GW nodes.

In one embodiment, the second formula (described previously) may be used to calculate the amount of data eligible to be delegated.

In another embodiment, the third formula (described previously) may be used to calculate the weighting or percentage.

In operation 1014, for each gateway in the one or more selected GW nodes, task information is retrieved from a corresponding entry and assigned to the particular GW node with task data version information.

In operation 1016, it is determined whether all tasks have been assigned. When all tasks have been assigned, method 1000 completes in operation 1018; otherwise, method 1000 returns to operation 1008 to repeat some of the operations.

In operation 1018, method 1000 ends as all tasks have been completed.

Accordingly, method 1000 provides for a foreground split of processes (tasks) at the owner GW node for a particular fileset. Method 1000 may be combined with any other method described herein in order to more fully dictate control over parallel I/O operations in a parallel I/O module or some other component of a data storage system.

Figure 11:
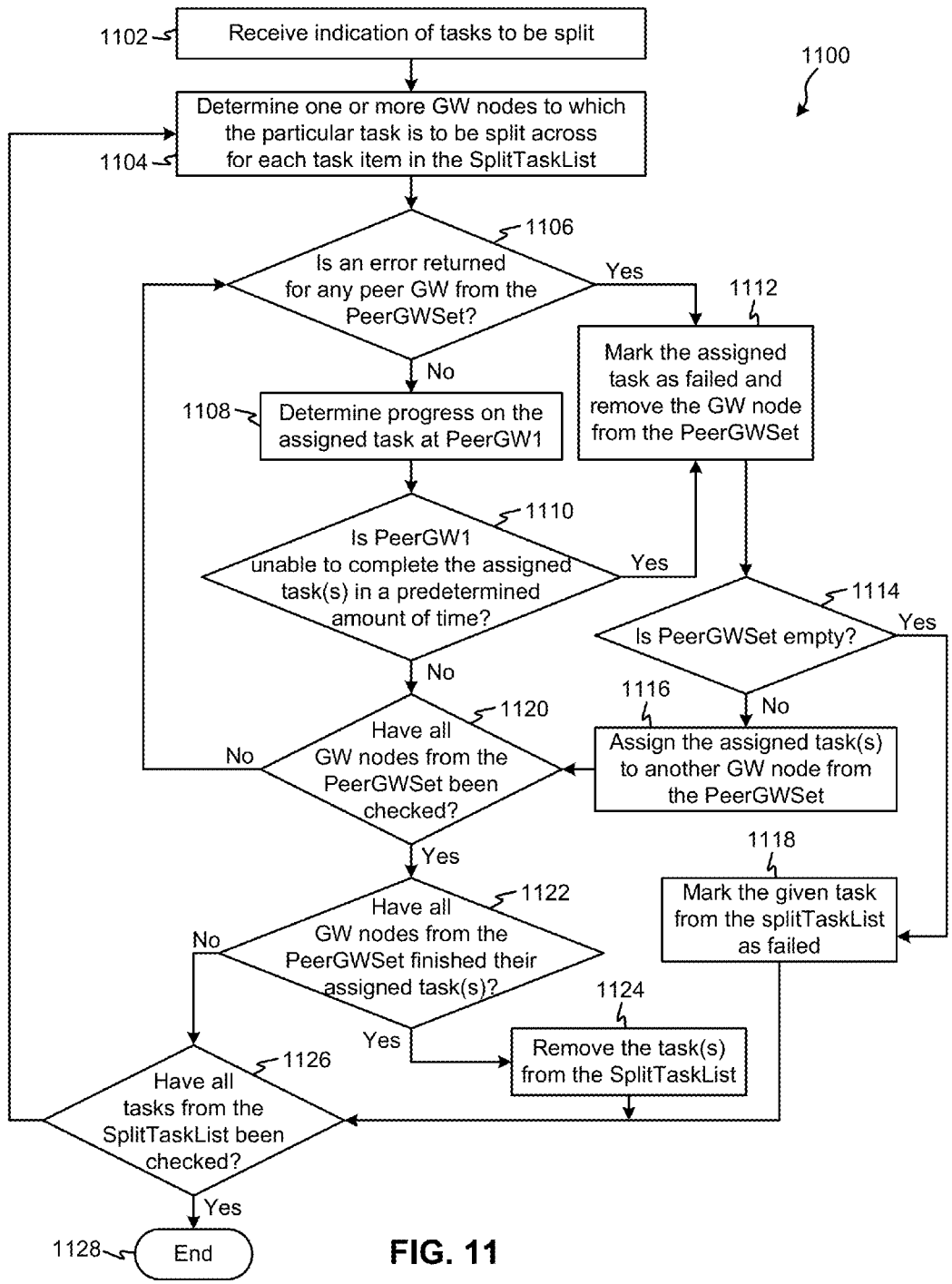
FIG. 11 shows a flow chart of a method in another embodiment.

Now referring to FIG. 11 a method 1100 is presented for split task monitoring, according to one embodiment. The method 1100 may be executed by a system using a processor which is configured to execute or otherwise cause the execution of embedded or standalone logic (which may be hardware, software, or a combination thereof) according to one embodiment. In another embodiment, the method 1100 may be executed by a computer program product which comprises a computer readable storage medium having computer program code stored therein.

The method 1100 may be performed in accordance with the present invention in any of the environments depicted in FIGS. 1-5, and 7 among others, in various embodiments. Of course, more or less operations than those specifically described in FIG. 11 may be included in method 1100, as would be understood by one of skill in the art upon reading the present descriptions.

In operation 1102, indication of tasks to be split is received. In one embodiment, this indication may be in the form of a list, SplitTaskList, which may be referred to determine the list of task items that have been sent to be split.

In operation 1104, for each task item in the SplitTaskList, determine one or more GW nodes to which the particular task is to be split across. The plurality of GW nodes to split the various tasks across may be included in a set of peer GW nodes, PeerGWSet, to which tasks are assigned for each task that is sent in the SplitTaskList.

In operation 1106, it is determined whether an error is returned for each peer GW, PeerGW1, from the PeerGWSet. When an error is returned for PeerGW1, method 1100 continues to operation 1112; otherwise method 1100 continues to operation 1108.

In operation 1108, it is determined whether PeerGW1 is making progress on performing the assigned task(s), using any technique known in the art.

In operation 1110, when PeerGW1 is unable to complete the assigned task(s) in a predetermined amount of time (which may be assigned automatically depending on the task(s) to be completed), method 1100 continues to operation 1120; otherwise method 1100 continues to operation 1112.

In operation 1112, the assigned task is marked as failed and the GW node is removed from the PeerGWSet. The indication of failure may be a bit that is flipped, or some other indication technique known in the art.

In operation 1114, it is determined whether PeerGWSet is empty (no more peer GW nodes have tasks assigned thereto), using any technique known in the art. When the PeerGWSet is empty, method 1100 continues to operation 1118; otherwise, method 1100 continues to operation 1116.

In operation 1116, the assigned task(s) is assigned to another GW node from the PeerGWSet.

In operation 1118, the given task from the splitTaskList (e.g., a splitTask) is marked as failed, since there are no more GW nodes to which the task may be assigned, and the previously assigned GW node(s) was unable to perform the task.

In operation 1120, it is determined whether all GW nodes from the PeerGWSet have been checked, using any technique known in the art. When all GW nodes have been checked, method 1100 continues to operation 1122; otherwise, method 1100 returns to operation 1106 to check a next GW node from the PeerGWSet.

In operation 1122, it is determined whether all GW nodes from the PeerGWSet have finished performing their assigned task(s). When all GW nodes from the PeerGWSet have finished performing their assigned task(s), method 1100 continues to operation 1124; otherwise method 1100 continues to operation 1126.

In operation 1124, the task is removed from the SplitTaskList, as it has been completed.

In operation 1126, it is determined whether all tasks from the SplitTaskList have been checked. When all tasks from the SplitTaskList have been checked, method 1100 continues to operation 1128 and ends; otherwise method 1100 returns to operation 1104 to choose a next task from the SplitTaskList.

In one embodiment, an amount of time or a duration, which may be predetermined, may be waited before performing method 1100 again, presumably with a SplitTaskList that has more tasks therein.

According to one embodiment, another table, Table 4, may be used to store other GW performance. This table may be maintained per GW node, and it stores performance history for other GW nodes for a given fileset. Below is a table for GW1.

TABLE 4

| Other GW Node | Fileset | Recent I/O Performance (MB/s) | Number of Tasks Assigned | Number of Tasks that Failed |
| --- | --- | --- | --- | --- |
| GW2 | Fileset1 | Node1 | 100 | 1 |
| GW3 | Fileset1 | Node2 | 100 | 1 |
| GW2 | Fileset2 | Node1 | 100 | 1 |
| GW3 | Fileset2 | Node2 | 100 | 4 |
| GW2 | Fileset3 | Node1 | 100 | 2 |
| GW3 | Fileset3 | Node2 | 50 | 1 |

Table 4 may be used to store any additional information about the performance of other GW nodes from the point of view of a first GW node, GW1.

In another embodiment, performance task tracking may be performed as described herein. For example, a performance log file may be created and maintained, and for each split I/O task: I/O performance is logged of each peer GW node for whom a task is assigned, along with overall split I/O task performance. The performance log file may be periodically referred to in order to determine performance of individual GW nodes. In addition, it may be used to check if overall performance is on par with an expected cumulative network performance, such as from Table 1. Also, it may be used to identify GW nodes for which expected performance is not met in order to change network parameter settings for underperforming GW nodes based on recent I/O size, to tune internal in-memory buffer sizes, and/or other resources known in the art.

In addition, when new I/O is queued at an owner GW node, the SplitTaskList may be referred to in order to determine which task items have been sent for split. When a new I/O is found to conflict with any tasks from the SplitTaskList, this task may be marked as dependant on the splitTask found in the SplitTaskList, and execution of the new I/O may be held (not allowed to occur) until the splitTask is complete.

In one embodiment, orphan task tracking may be performed whenever a current owner GW node for a given fileset changes and a new owner GW node takes over, before the start of any I/O activity, messages may be sent to all other GW nodes to determine whether any other GW node is executing any split I/O task for the given fileset. Any other GW node which is executing any split I/O task for the given fileset is expected to drop the split I/O task upon receiving the inquiry.

Figure 12:
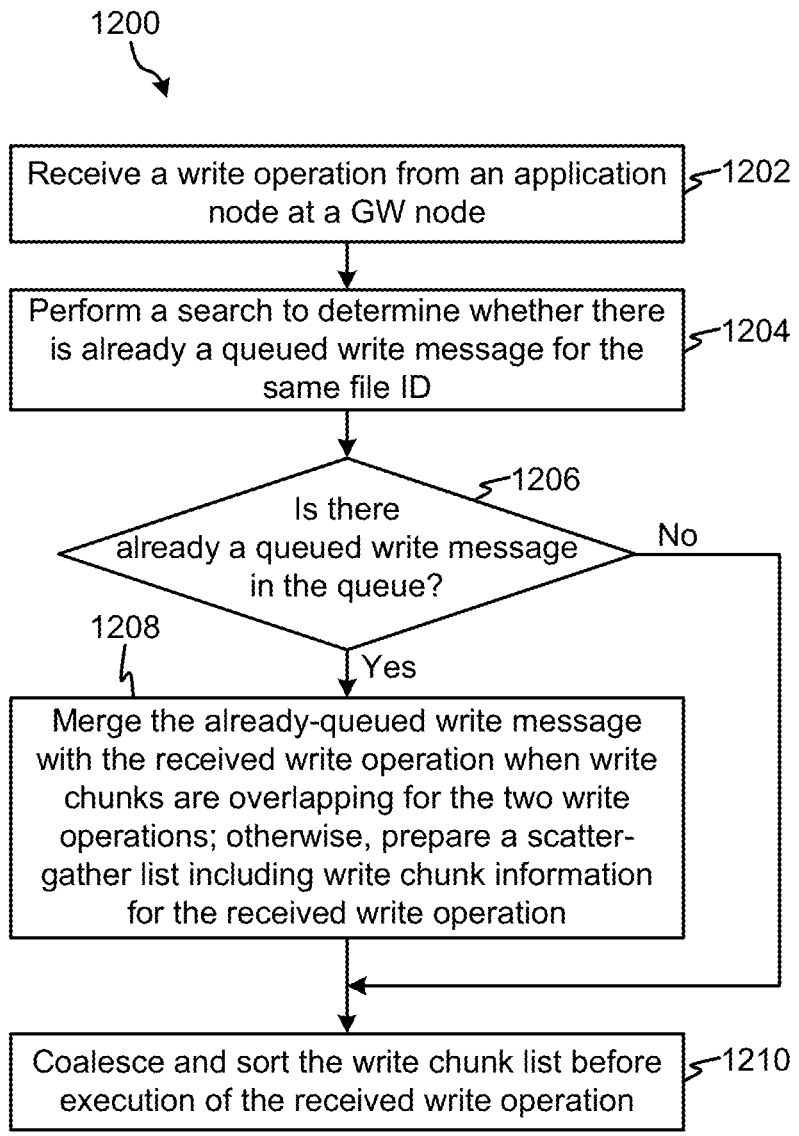
FIG. 12 shows another method in accordance with an embodiment.

With reference to FIG. 12, a flowchart for queuing a write operation is shown according to one embodiment. The method 1200 may be executed by a system using a processor which is configured to execute or otherwise cause the execution of embedded or standalone logic (which may be hardware, software, or a combination thereof) according to one embodiment. In another embodiment, the method 1200 may be executed by a computer program product which comprises a computer readable storage medium having computer program code stored therein.

The method 1200 may be performed in accordance with the present invention in any of the environments depicted in FIGS. 1-5, and 7 among others, in various embodiments. Of course, more or less operations than those specifically described in FIG. 12 may be included in method 1200, as would be understood by one of skill in the art upon reading the present descriptions.

In operation 1202, a write operation is received from an application node at a GW node. The write operation describes a file ID, a start offset value, and an end offset value. The operation is maintained, such as by Panache or some other suitable system, while the queue is stored in the form of a hash table or some other suitable data storage construct. The hash table allows for quick searching using a given file ID as a key.

In operation 1204, a search is performed when there is already a queued write message for the same file ID.

In operation 1206, it is determined whether an already queued write message is found in the queue. When a write message is already in the queue, method 1200 continues to operation 1208; otherwise, method 1200 continues to operation 1210.

In operation 1208, the already-queued write message is merged with the received write operation in operation 1202 when write chunks are overlapping for the two write operations; otherwise, a scatter-gather list including write chunk information for the received write operation is prepared.

In operation 1210, the write chunk list is coalesced and sorted, using any technique known in the art to accomplish the sorting and coalescing, before execution of the received write operation.

Figure 13:
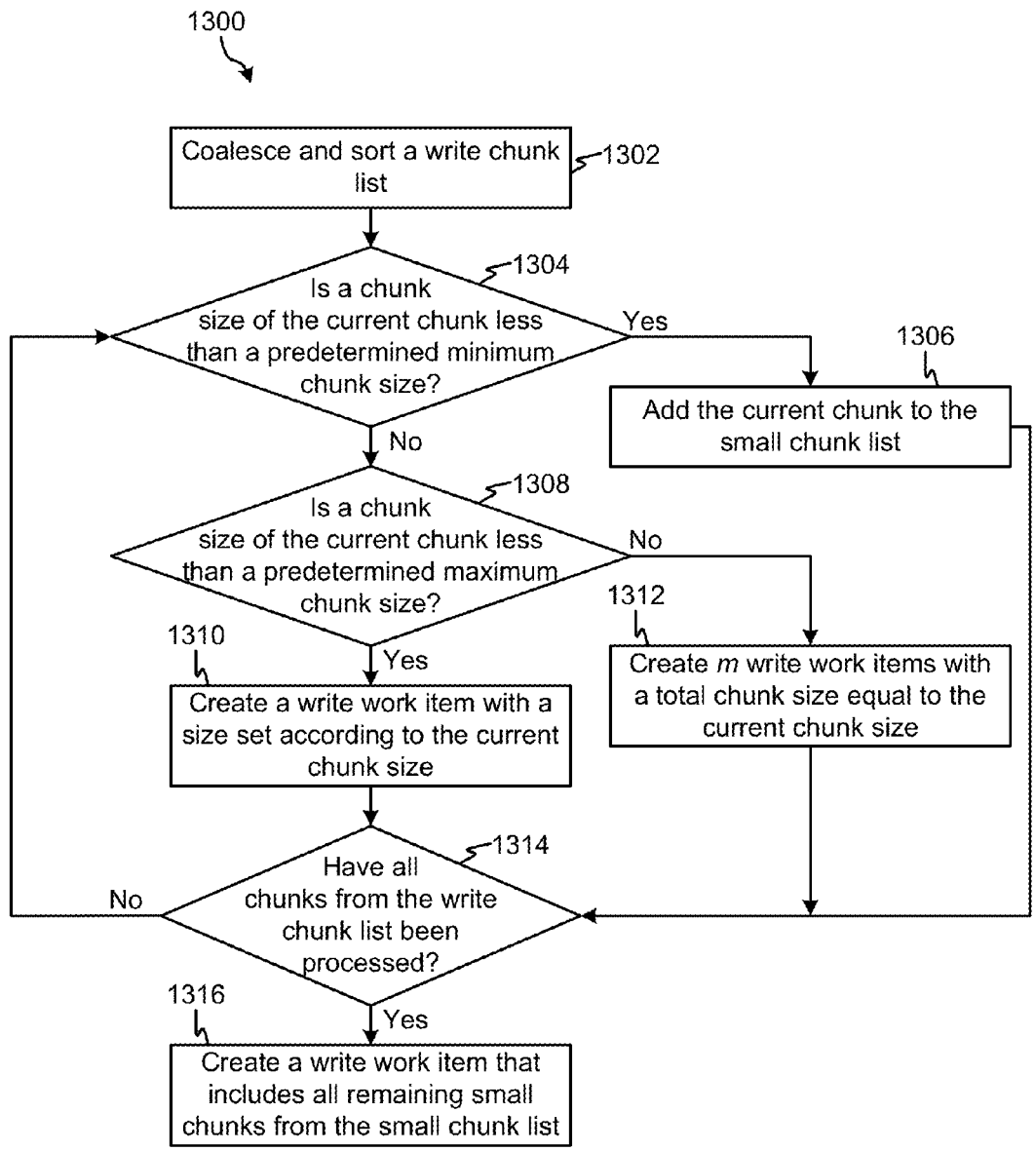
FIG. 13 shows a flow chart of another method in yet another embodiment.

With reference to FIG. 13, a flowchart for handling distribution of a write task is shown according to one embodiment. The method 1300 may be executed by a system using a processor which is configured to execute or otherwise cause the execution of embedded or standalone logic (which may be hardware, software, or a combination thereof) according to one embodiment. In another embodiment, the method 1300 may be executed by a computer program product which comprises a computer readable storage medium having computer program code stored therein.

The method 1300 may be performed in accordance with the present invention in any of the environments depicted in FIGS. 1-5, and 7 among others, in various embodiments. Of course, more or less operations than those specifically described in FIG. 13 may be included in method 1300, as would be understood by one of skill in the art upon reading the present descriptions.

In operation 1302, a write chunk list for a given write operation is coalesced and sorted using any technique known in the art. The write chunk list may a list of chunks of data corresponding to the write operation. A small chunk list may be an empty chunk list used to store data chunks which are not part of the present work item, e.g., the write operation.

In operation 1304, for each chunk in the write chunk list, it is determined whether a chunk size of the current chunk being analyzed is less than a predetermined minimum chunk size. When the current chunk size is less than the predetermined minimum chunk size, method 1300 continues to operation 1306; otherwise, method 1300 continues to operation 1308.

In operation 1306, the current chunk is added to the small chunk list. In this way, the small chunk list may accumulate many smaller data chunks over time, which may be combined to form a larger write operation.

According to one embodiment, when a sum of all chunks in the small chunk list exceeds the predetermined minimum chunk size, a work item is created that includes the data chunks that are presently included in the small chunk list while ensuring that splitting is allowed in fileset boundary check logic.

In operation 1308, it is determined whether the current chunk size is less than a predetermined maximum chunk size. When the current chunk size is less than the predetermined maximum chunk size, method 1300 continues to operation 1310; otherwise, method 1300 continues to operation 1312.

In operation 1310, a write work item is created with a size set according to the current chunk size.

In one embodiment, the write work item may be merged with chunks from the small chunk list while ensuring that splitting is allowed in the fileset boundary check logic.

In operation 1312, when m equals the current chunk size divided by the maximum chunk size (rounded up to the nearest integer), m write work items are created with a total chunk size equal to the current chunk size.

In one embodiment, a first chunk may be merged with chunks from the small chunk list while ensuring that splitting is allowed in the fileset boundary check logic.

In operation 1314, it is determined whether all chunks from the write chunk list have been processed (assigned to a write work item), e.g., the write chunk list is empty. When all chunks from the write chunk list have been processed, method 1300 continues to operation 1316; otherwise, method 1300 returns to operation 1304 to continue processing data chunks from the write chunk list.

In operation 1316, a write work item is created that includes all remaining small chunks from the small chunk list, thereby ensuring that all data chunks are assigned to a write work item.

Figure 14:
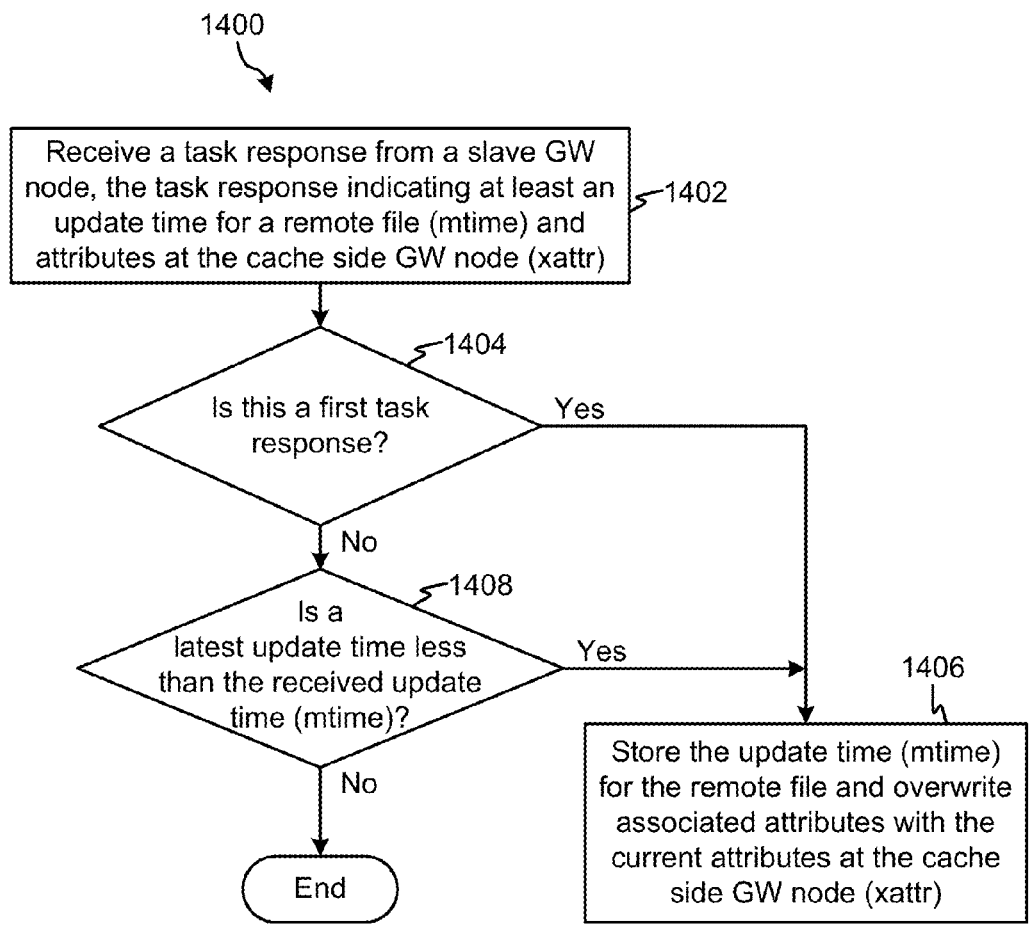
FIG. 14 shows a method according to another embodiment.

With reference to FIG. 14, a flowchart for write response processing is shown according to one embodiment. The method 1400 may be executed by a system using a processor which is configured to execute or otherwise cause the execution of embedded or standalone logic (which may be hardware, software, or a combination thereof) according to one embodiment. In another embodiment, the method 1400 may be executed by a computer program product which comprises a computer readable storage medium having computer program code stored therein.

The method 1400 may be performed in accordance with the present invention in any of the environments depicted in FIGS. 1-5, and 7 among others, in various embodiments. Of course, more or less operations than those specifically described in FIG. 14 may be included in method 1400, as would be understood by one of skill in the art upon reading the present descriptions. In one embodiment, method 1400 may be executed at a master GW node.

In operation 1402, a task response is received from a slave GW node, the task response indicating at least an update time for a remote file (mtime) and attributes at the cache side GW node (xattr). These values may be represented in a tuple, such as <updated mtime of remote file, xattr at the cache side inode>, in one embodiment.

In operation 1404, it is determined whether this is a first task response, e.g., no other task responses have been received for the current task. When this is the first task response, method 1400 continues to operation 1406; otherwise, method 1400 continues to operation 1408.

In operation 1406, the update time (mtime) for the remote file is stored (and overwrites any previous mtime stored) and associated attributes are overwritten with the current attributes at the cache side GW node (xattr), and method 1400 ends. In this way, the received mtime may be written as the latest mtime.

In operation 1408, it is determined whether a latest update time (latest mtime) is less than the received update time (mtime). When the latest mtime is less than the received mtime, method 1400 continues to operation 1406; otherwise, method 1400 ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, comprising a computer readable storage medium having program code embodied therewith, the embodied program code executable by a processor to cause the processor to:
   write, by the processor, data for a first fileset using an owner gateway (GW) node;
   determine, by the processor, whether to utilize one or more other GW nodes to handle at least a portion of write traffic for the first fileset;
   select, by the processor, a set of eligible GW nodes based on at least a network workload;
   assign and define, by the processor, a size for one or more write task items for each GW node in the set of eligible GW nodes based on a current dynamic profile of each individual GW node in the set of eligible GW nodes;
   coalesce and sort, by the processor, a write chunk list for a write operation related to the one or more write task items;
   determine, by the processor, a size of each write chunk in the write chunk list;
   aggregate, by the processor, all write chunks from the write chunk list which have a size that is less than a predetermined minimum chunk size into a small chunk list;
   create, by the processor, a write work item including all write chunks in the small chunk list in response to a determination that a sum of all write chunks in the small chunk list exceeds the predetermined minimum chunk size and a determination that no more write chunks are left to be processed in the write chunk list;
   provide and/or ensure, by the processor, availability to in-memory and/or input/output (I/O) resources at each GW node in the set of eligible GW nodes to handle one or more assigned write task items; and
   distribute, by the processor, workload to the set of eligible GW nodes according to the size for each of the one or more assigned write task items for each individual GW node in the set of eligible GW nodes.

2. The computer program product as recited in claim 1, wherein the embodied program code that causes the processor to determine whether to utilize the one or more other GW nodes to handle the portion of the write traffic for the first fileset is performed as a process selected from the group consisting of: a background process periodically, and a foreground process before initiating a large I/O request according to a predetermined I/O size threshold, wherein the embodied program code that causes the processor to select, by the processor, the set of eligible GW nodes is further based on at least one parameter selected from the group consisting of: a current internal workload and recent performance history data in regard to workload distribution across the one or more other GW nodes, and wherein the embodied program code further causes the processor to:
   receive, by the processor, a write operation from an application node, the write operation including a file identifier, a start offset value, and an end offset value related to the one or more write task items; and search, by the processor, a write queue to determine whether a write message for the file identifier is already in the write queue.

3. The computer program product as recited in claim 1, wherein the embodied program code further causes the processor to determine, by the processor, an amount of workload corresponding to the first fileset at the owner GW node based on at least one parameter selected from the group consisting of: an amount of data present in I/O requests that are queued for the first fileset, an amount of data in outstanding I/O requests for the first fileset that have been issued and/or received but not yet completed, an I/O workload at one or more other GW nodes due to traffic from one or more other filesets, and an I/O workload at the one or more other GW nodes that are functioning as an application node serving local applications.

4. The computer program product as recited in claim 3, wherein the embodied program code further causes the processor to determine, by the processor, the amount of workload corresponding to the first fileset for other GW nodes which have connectivity with the owner GW node.

5. The computer program product as recited in claim 1, wherein the embodied program code further causes the processor to:
receive, by the processor, indication of the one or more write task items to be split;
determine, by the processor, the one or more GW nodes to split each of the one or more write task items across individually;
remove, by the processor, any GW node from the set of eligible GW nodes in response to a determination that an error occurs at a GW node during write task processing; and
reassign, by the processor, any write task items that were assigned to a GW node that was removed from the set of eligible GW nodes to another GW node from the set of eligible GW nodes.

6. The computer program product as recited in claim 1, wherein the embodied program code further causes the processor to:
receive, by the processor, a write operation from an application node, the write operation including a file identifier, a start offset value, and an end offset value related to the one or more write task items;
search, by the processor, a write queue to determine whether a write message for the file identifier is already in the write queue;
merge, by the processor, any already-queued write messages with the write operation in response to a determination that the file identifier is already in the write queue and write chunks are overlapping for the already-queued write messages and the write operation; and
prepare, by the processor, a scatter-gather list including write chunk information for the write operation in response to a determination that the file identifier is not already in the write queue.

7. The computer program product as recited in claim 1, wherein the embodied program code further causes the processor to:
coalesce and sort, by the processor, a write chunk list for a write operation related to the one or more write task items;
determine, by the processor, a size of each write chunk in the write chunk list;

aggregate, by the processor, all write chunks from the write chunk list which have a size that is less than a predetermined minimum chunk size into a small chunk list;
create, by the processor, a write work item including all write chunks in the small chunk list in response to a determination that a sum of all write chunks in the small chunk list exceeds the predetermined minimum chunk size and a determination that no more write chunks are left to be processed in the write chunk list;
create, by the processor, a write work item for each write chunk from the write chunk list which has a size that is greater than the predetermined minimum chunk size and less than a predetermined maximum chunk size, the write work item having a size related to a size of the write chunk from the write chunk list having the size that is greater than the predetermined minimum chunk size and less than the predetermined maximum chunk size; and
create, by the processor, more than one write work item for each write chunk from the write chunk list which has a size that is greater than the predetermined maximum chunk size, a number of write work items created being related to how many times greater the size of the write chunk is than the predetermined maximum chunk size.

8. The computer program product as recited in claim 1, wherein the embodied program code further causes the processor to:
receive, by the processor, a task response from a slave GW node, the task response indicating at least an update time for a remote file, and attributes at a cache side GW node; and
store, by the processor, the update time and the attributes for the remote file in response to a determination that: the task response is a first task response or the update time for the remote file is more recent than a stored update time.

9. A method comprising:
using an owner gateway (GW) node to write data for a first fileset;
determining whether to utilize one or more other GW nodes to handle at least a portion of write traffic for the first fileset;
selecting a set of eligible GW nodes based on at least a network workload;
assigning and defining a size for one or more write task items for each GW node in the set of eligible GW nodes based on a current dynamic profile of each individual GW node in the set of eligible GW nodes;
coalescing and sorting a write chunk list for a write operation related to the one or more write task items;
determining a size of each write chunk in the write chunk list;
aggregating all write chunks from the write chunk list which have a size that is less than a predetermined minimum chunk size into a small chunk list;
creating a write work item including all write chunks in the small chunk list in response to a determination that a sum of all write chunks in the small chunk list exceeds the predetermined minimum chunk size and a determination that no more write chunks are left to be processed in the write chunk list;
providing and/or ensuring availability to in-memory and/or input/output (I/O) resources at each GW node in the set of eligible GW nodes to handle one or more assigned write task items; and distributing workload to the set of eligible GW nodes according to the size for each of the one or more assigned write task items for each individual GW node in the set of eligible GW nodes.

10. The method as recited in claim 9, wherein the determining whether to utilize the one or more other GW nodes to handle the portion of the write traffic for the first fileset is performed as a process selected from the group consisting of: a background process periodically, and a foreground process before initiating a large I/O request according to a predetermined I/O size threshold, and wherein the selecting the set of eligible GW nodes is further based on at least one parameter selected from the group consisting of: a current internal workload and recent performance history data in regard to workload distribution across the one or more other GW nodes.

11. The method as recited in claim 9, further comprising determining an amount of workload corresponding to the first fileset at the owner GW node based on at least one parameter selected from the group consisting of: an amount of data present in I/O requests that are queued for the first fileset, an amount of data in outstanding I/O requests for the first fileset that have been issued and/or received but not yet completed, an I/O workload at one or more other GW nodes due to traffic from one or more other filesets, and an I/O workload at the one or more other GW nodes that are functioning as an application node serving local applications.

12. The method as recited in claim 11, further comprising determining the amount of workload corresponding to the first fileset for other GW nodes which have connectivity with the owner GW node.

13. The method as recited in claim 9, further comprising:
receiving indication of the one or more write task items to be split;
determining the one or more GW nodes to split each of the one or more write task items across individually;
removing any GW node from the set of eligible GW nodes in response to a determination that an error occurs at a GW node during write task processing; and
reassigning any write task items that were assigned to a GW node that was removed from the set of eligible GW nodes to another GW node from the set of eligible GW nodes.

14. The method as recited in claim 9, further comprising:
receiving a write operation from an application node, the write operation including a file identifier, a start offset value, and an end offset value related to the one or more write task items;
searching a write queue to determine whether a write message for the file identifier is already in the write queue;
merging any already-queued write messages with the write operation in response to a determination that the file identifier is already in the write queue and write chunks are overlapping for the already-queued write messages and the write operation; and
preparing a scatter-gather list including write chunk information for the write operation in response to a determination that the file identifier is not already in the write queue,
wherein the write queue is stored as a hash table.

15. The method as recited in claim 9, further comprising:
creating a write work item for each write chunk from the write chunk list which has a size that is greater than the predetermined minimum chunk size and less than a predetermined maximum chunk size, the write work item having a size related to a size of the write chunk from the write chunk list having the size that is greater than the predetermined minimum chunk size and less than the predetermined maximum chunk size; and
creating more than one write work item for each write chunk from the write chunk list which has a size that is greater than the predetermined maximum chunk size, a number of write work items created being related to how many times greater the size of the write chunk is than the predetermined maximum chunk size.

16. The method as recited in claim 9, further comprising:
receiving a task response from a slave GW node, the task response indicating at least an update time for a remote file, and attributes at a cache side GW node; and
storing the update time and the attributes for the remote file in response to a determination that: the task response is a first task response or the update time for the remote file is more recent than a stored update time.

17. A system, comprising:
a processor; and
logic integrated with the processor, executable by the processor, or integrated with and executable by the processor, the logic being configured to cause the processor to:
use an owner gateway (GW) node to write data for a first fileset;
determine whether to utilize one or more other GW nodes to handle at least a portion of write traffic for the first fileset via a foreground process before initiating an input/output (I/O) request that exceeds a predetermined I/O size threshold;
select a set of eligible GW nodes based on at least a network workload;
assign and define a size for one or more write task items for each GW node in the set of eligible GW nodes based on a current dynamic profile of each individual GW node in the set of eligible GW nodes;
coalesce and sort a write chunk list for a write operation related to the one or more write task items;
determine a size of each write chunk in the write chunk list;
aggregate all write chunks from the write chunk list which have a size that is less than a predetermined minimum chunk size into a small chunk list;
create a write work item including all write chunks in the small chunk list in response to a determination that a sum of all write chunks in the small chunk list exceeds the predetermined minimum chunk size and a determination that no more write chunks are left to be processed in the write chunk list;
provide and/or ensure availability to in-memory and/or I/O resources at each GW node in the set of eligible GW nodes to handle one or more assigned write task items; and
distribute workload to the set of eligible GW nodes according to the size for each of the one or more assigned write task items for each individual GW node in the set of eligible GW nodes.

18. The system as recited in claim 17, wherein the logic is further configured to cause the processor to:
determine an amount of workload corresponding to the first fileset at the owner GW node based on at least one parameter selected from the group consisting of: an amount of data present in I/O requests that are queued for the first fileset, an amount of data in outstanding I/O requests for the first fileset that have been issued and/or received but not yet completed, an I/O workload at one or more other GW nodes due to traffic from one or more other filesets, and an I/O workload at the one or more other GW nodes that are functioning as an application node serving local applications; and determine the amount of workload corresponding to the first fileset for other GW nodes which have connectivity with the owner GW node.

19. The system as recited in claim 17, wherein the logic is further configured to cause the processor to:

receive indication of the one or more write task items to be split;

determine the one or more GW nodes to split each of the one or more write task items across individually;

remove any GW node from the set of eligible GW nodes in response to a determination that an error occurs at a GW node during write task processing;

reassign any write task items that were assigned to a GW node that was removed from the set of eligible GW nodes to another GW node from the set of eligible GW nodes;

receive a write operation from an application node, the write operation including a file identifier, a start offset value, and an end offset value related to the one or more write task items;

search a write queue to determine whether a write message for the file identifier is already in the write queue;

merge any already-queued write messages with the write operation in response to a determination that the file identifier is already in the write queue and write chunks are overlapping for the already-queued write messages and the write operation; and prepare a scatter-gather list including write chunk information for the write operation in response to a determination that the file identifier is not already in the write queue.

20. The system as recited in claim 17, wherein the logic is further configured to cause the processor to:

create a write work item for each write chunk from the write chunk list which has a size that is greater than the predetermined minimum chunk size and less than a predetermined maximum chunk size, the write work item having a size related to a size of the write chunk from the write chunk list having the size that is greater than the predetermined minimum chunk size and less than the predetermined maximum chunk size;

create more than one write work item for each write chunk from the write chunk list which has a size that is greater than the predetermined maximum chunk size, a number of write work items created being related to how many times greater the size of the write chunk is than the predetermined maximum chunk size;

receive a task response from a slave GW node, the task response indicating at least an update time for a remote file, and attributes at a cache side GW node; and store the update time and the attributes for the remote file in response to a determination that: the task response is a first task response or the update time for the remote file is more recent than a stored update time.

\* \* \* \* \*